United States Patent
Lemke et al.

(10) Patent No.: US 9,596,741 B2
(45) Date of Patent: Mar. 14, 2017

(54) DIMMING CONTROL INCLUDING AN ADJUSTABLE OUTPUT RESPONSE

(75) Inventors: Jared Lemke, Pleasant Grove, UT (US); James Beagley, Taylorsville, UT (US); Scott Chandler, Spanish Fork, UT (US); Michael Whatcott, Lehi, UT (US); Douglas Allen, Lindon, UT (US); David Earl James, Orem, UT (US); Jon Erik Knabenschuh, Orem, UT (US)

(73) Assignee: Legrand North America, LLC, San Jose, CA (US)

( * ) Notice: Subject to any disclaimer, the term of this patent is extended or adjusted under 35 U.S.C. 154(b) by 1019 days.

(21) Appl. No.: 13/604,007

(22) Filed: Sep. 5, 2012

(65) Prior Publication Data

US 2014/0067147 A1    Mar. 6, 2014

(51) Int. Cl.
*G06F 1/26* (2006.01)
*H05B 39/04* (2006.01)
*H05B 37/02* (2006.01)

(52) U.S. Cl.
CPC ....... *H05B 39/044* (2013.01); *H05B 37/0254* (2013.01)

(58) Field of Classification Search
CPC .......................................................... G06F 1/26
USPC ........................................ 700/295; 315/194
See application file for complete search history.

(56) References Cited

U.S. PATENT DOCUMENTS

| | | |
|---|---|---|
| 4,196,388 A | 4/1980 | Weller et al. |
| 5,361,184 A | 11/1994 | El-Sharkawi et al. |
| 5,473,202 A | 12/1995 | Mudge et al. |
| 5,523,631 A | 6/1996 | Fishman et al. |
| 5,563,459 A | 10/1996 | Kurosawa et al. |
| 5,638,296 A | 6/1997 | Johnson et al. |
| 6,091,205 A | 7/2000 | Newman et al. |
| 6,233,132 B1 | 5/2001 | Jenski |
| 6,331,687 B1 | 12/2001 | Dunk et al. |
| 6,768,615 B2 | 7/2004 | Liu |
| 8,154,841 B2 | 4/2012 | Allen et al. |
| 2006/0108950 A1* | 5/2006 | Chansky et al. ............. 315/294 |
| 2009/0055760 A1 | 2/2009 | Whatcott et al. |
| 2009/0303171 A1* | 12/2009 | Chang .................. G09G 3/3426 345/102 |

* cited by examiner

*Primary Examiner* — Tejal Gami
(74) *Attorney, Agent, or Firm* — McCarter & English, LLP

(57) ABSTRACT

The present disclosure provides improved dimming or dimmer assemblies/modules for controlling lights or loads (e.g., as part of a control or automation system). More particularly, the present disclosure provides for systems and methods for utilizing dimmer control assemblies/modules advantageously having: (i) an adjustable output response, (ii) enhanced thermal management, (iii) a voltage detector to determine amplitude and zero-crossing, and/or (iv) an estimation of power consumption for multiple loads (e.g., using a single sensor).

4 Claims, 14 Drawing Sheets

DIMMING CONTROL INCLUDING AN ADJUSTABLE OUTPUT RESPONSE

BACKGROUND

1. Technical Field

The present disclosure relates to dimming or dimmer assemblies/modules for controlling lights or loads and, more particularly, to dimmer control assemblies/modules having: (i) an adjustable output response, (ii) enhanced thermal management, (iii) a voltage detector to determine amplitude and zero-crossing, and/or (iv) an estimation of power consumption for multiple loads (e.g., using a single sensor).

2. Background Art

In general, dimming or dimmer modules/assemblies that control dimmable lights or loads are known. For example, some conventional dimmer modules are configured and adapted to control dimmable lights/loads including LED, incandescent and fluorescent, magnetic low-voltage, electronic low-voltage, neon, cold cathode and/or variable speed motors. Dimmer modules are generally useful in a myriad of different environments for residential, commercial and/or industrial applications.

In some conventional assemblies, the dimmer modules are utilized as the lighting (e.g., high-voltage lighting) and/or load control points for a centralized and/or distributed system (e.g., an automation or control system). For example, lights or loads in the centralized system may be wired (e.g., home-run wired) back to a dimmer module, which may be installed and/or housed in an enclosure or the like. The enclosure or the like is typically installed in a mechanical room or electrical closet, and may also house or contain a controller/processor (e.g., an automation system controller/processor).

In general, some of the challenges that arise when creating a dimming module/product can include: (i) implementing an accurate zero-crossing detector, (ii) producing an output that is substantially smooth as the level is adjusted, (iii) providing useful feedback to the user regarding the operating conditions such as power consumption of the loads, and/or (iv) managing the heat that is generated by the dimming modules or dimming circuits.

Some dimmer modules/assemblies for alternating current (AC) loads can generally adjust the output level by turning on power to the load for only a portion of each cycle of the AC supply. The turn-on timing typically should be consistent from cycle to cycle to ensure that the output does not have any substantial detectable variation when set to a specific level. In general, the timing for the turn-on is often referenced to the zero-crossing point of the AC supply. In the case of a lighting control, the method used to detect the zero-crossing typically should be accurate enough to avoid substantial errors in the turn-on that would cause a visibly detectable change in the output. The method should also be robust in the face of noise levels that are sometimes common on the incoming AC supply.

For example, some conventional dimmer modules/assemblies detect the zero-crossing by applying some hardware filtering to the measured line feed and then converting the AC signal to digital pulses by choosing a threshold and then toggling a signal high and low as it crosses the threshold. The timing of the pulses is then typically measured using a microcontroller and further processing can be done with the microcontroller, such as, for example, compensating for delay introduced by the hardware filter, and averaging multiple measurements to create a more stable reference.

Moreover, it typically is a general requirement for high quality dimming controls to provide an output (e.g., light intensity) that varies substantially smoothly during the transition from one output setting to the next. In general, there are three basic issues that affect the smoothness of the dimmer output for lighting controls. First, the human eye typically has a non-linear response to differences in light intensity. Second, the output of some lighting loads is typically not substantially linear with respect to the input power. Third, the output of some lighting loads typically does not change when being dimmed near the high and/or low end of the input signal.

It is noted that some new load types that are becoming common generally have more unusual output characteristics than in the past when controlled by a dimmer module/assembly. Compact-fluorescent lights (CFL) and light-emitting diodes (LED) are examples of these new load types. The output characteristics of these and other loads may have a response that is not able to be adequately corrected for by adding simple curvature to the dimming control signal.

It is also noted that providing certain information about the loads that a dimmer module/assembly controls can generally be useful to the end user. For example, some conventional dimmer modules/assemblies have been adapted and configured to provide an estimate of the power being used by the loads. This may be accomplished by entering the rated power for each connected load into the software that controls the dimmer module/assembly. In general, this data may typically be entered based on the actual loads that were installed when the system was commissioned. The software would then use this information along with the active dim setting on each load to calculate an estimate of the power being consumed.

Furthermore, the circuits that provide dimming control of a load typically generate heat that should be managed so that the assembly/product generally operates at a temperature that does not reach and/or exceed the rated limits of the devices used in the circuit. For example, some primary heat sources are the switching semiconductors that switch the power to the load on and off. Depending on the capacity of the dimmer, the switching semiconductors may generate from a few watts up to tens of watts or more. As an example, some conventional dimming modules typically require that the switching semiconductors generate around about 16 Watts. To manage this heat, a metal heat sink may be incorporated as part of the design. The heat sink typically conducts heat away from the switching semiconductors and generally allows it to more efficiently dissipate into the surrounding environment. Moreover, attaching the semiconductors to the heat sink typically has an effect on the efficiency of the cooling provided by the heat sink.

For example, some various conventional methods have attached the semiconductors to the heat sink. One common method is to use semiconductors that mount perpendicular or vertically with respect to the printed circuit board surface and then screw them to the heat sink. Another conventional method used is to mount the semiconductors parallel or horizontally with respect to the surface of the printed circuit board and then attach the heat sink to the back side of the circuit board. This method typically uses an array of metal-filled holes in the circuit board to conduct heat from the side that the semiconductor is on to the side that the heat sink is on. Additionally, commercial dimmers are typically required by electrical code to be installed inside of an enclosure that is mounted on a wall or recessed into a wall. As such, it is generally desirable to keep the depth of the enclosure to a minimum, so multiple dimmers may be installed one above the other in a vertical enclosure. Some conventional designs utilize perforations on the front of the enclosure so that hot air can generally escape and cool air can enter. Moreover, utilizing fans inside the enclosure is typically unacceptable in most installations, so the enclosure should rely mostly on convective cooling.

Thus, despite efforts to date, a need remains for improved and efficient systems/methods that provide for dimming or dimmer assemblies/modules that control lights or loads. More particularly, a need remains for improved and efficient systems/methods that provide for dimmer control assemblies/modules having: (i) an adjustable output response, (ii) enhanced thermal management, (iii) a voltage detector to determine amplitude and zero-crossing, and/or (iv) an estimation of power consumption for multiple loads (e.g., using a single sensor).

These and other inefficiencies and opportunities for improvement are addressed and/or overcome by the systems, assemblies and methods of the present disclosure.

SUMMARY

The present disclosure provides an advantageous dimming or dimmer assembly/module for controlling lights or loads (e.g., as part of a control or automation system). In exemplary embodiments, the present disclosure provides for improved systems and methods for utilizing dimmer control assemblies/modules advantageously having: (i) an output response that is adjustable in a customized manner, (ii) enhanced thermal management, (iii) a voltage detector and enhanced algorithms to determine amplitude and zero-crossing, and/or (iv) an estimation of power consumption for multiple loads (e.g., using a single sensor).

The present disclosure provides for a control assembly including a first load circuit, the first load circuit including a first load control device, a second load control device, a first current detector and a first voltage detector, the first load control device in communication with a first controlled device and the second load control device in communication with a second controlled device; a processor in communication with the first and second load control devices, the first current detector and the first voltage detector; and a first line feed associated with the first load circuit and in communication with the first and second load control devices, the first current detector and the first voltage detector; wherein at least a portion of the first line feed is configured to travel to and be output by the first load control device as a first load output to the first controlled device; and wherein at least a portion of the first line feed is configured to travel to and be output by the second load control device as a second load output to the second controlled device.

The present disclosure also provides for a control assembly wherein the processor is in communication with a master controller of an automation system, the master controller configured and adapted to transmit command signals to the processor to change the status of the first and second controlled devices.

The present disclosure also provides for a control assembly wherein the first load circuit further includes a third load control device, the third load control device in communication with: (i) a third controlled device, (ii) the processor, and (iii) the first line feed; and wherein at least a portion of the first line feed is configured to travel to and be output by the third load control device as a third load output to the third controlled device.

The present disclosure also provides for a control assembly further including a second load circuit, the second load circuit including a third load control device, a fourth load control device, a second current detector and a second voltage detector, the third load control device in communication with a third controlled device and the fourth load control device in communication with a fourth controlled device; and a second line feed associated with the second load circuit and in communication with the third and fourth load control devices, the second current detector and the second voltage detector; wherein the processor is in communication with the third and fourth load control devices, the second current detector and the second voltage detector; wherein at least a portion of the second line feed is configured to travel to and be output by the third load control device as a third load output to the third controlled device; and wherein at least a portion of the second line feed is configured to travel to and be output by the fourth load control device as a fourth load output to the fourth controlled device.

The present disclosure also provides for a control assembly wherein the processor is configured and adapted to run a calibration sequence that turns on the first and second controlled devices separately and individually at multiple dim levels; wherein the processor is adapted to receive for each dim level of the first and second controlled devices: (i) a current measurement provided by the first current detector, and (ii) a voltage measurement provided by the first voltage detector; and wherein the processor is adapted to calculate and store a measurement of the average power consumed by the first and second controlled devices at each dim level by utilizing the respective current and voltage measurements of the first and second controlled devices at each dim level.

The present disclosure also provides for a control assembly wherein after the calibration is completed and the power consumption measurements are stored, the processor is adapted to calculate the power consumption of the first and second controlled devices at the present dim level of the first and second controlled devices by utilizing the stored measurements.

The present disclosure also provides for a control assembly wherein the calibration sequence turns on the first and second controlled devices at multiple dim levels from a low dim level to a high dim level. The present disclosure also provides for a control assembly wherein the calibration sequence turns on the first and second controlled devices at about eight different dim levels, each dim level spaced substantially evenly apart from one another.

The present disclosure also provides for a control assembly wherein the processor is adapted to: (i) run a calibration sequence that turns on the first and second controlled devices separately and individually at a maximum setting, (ii) receive a current measurement provided by the first current detector, and a voltage measurement provided by the first voltage detector for the first and second controlled devices at the maximum setting, and (iii) calculate and store a measurement of the power consumed by the first and second controlled devices at the maximum setting by utilizing the respective current and voltage measurements at the maximum setting; wherein after the calibration sequence is completed and the maximum setting power consumption measurements are stored, the processor is further adapted to: (i) receive a current measurement provided by the first current detector and a voltage measurement provided by the first voltage detector for the first and second controlled devices at the present dim level of the first and second controlled devices, and (ii) calculate and store a measurement of the total average power used by both the first and second controlled devices at the present dim level by utilizing the respective current and voltage measurements at the present dim level; and wherein the processor is adapted to calculate the average power drawn at the present dim level by each individual first and second controlled device by utilizing: (i) the measurements of the power consumed by the first and second controlled devices at the maximum setting, (ii) the measurement of the total average power used by both the first and second controlled devices at the present dim level, and (iii) the percentage of the present dim level.

The present disclosure also provides for a control assembly wherein the average power drawn at the present dim level by each individual first and second controlled device satisfies the equation:

$$Pload = Pex + \frac{Pw \times Pd}{Ptw};$$

wherein Pex is the percent of the present dim level multiplied by the respective measurement of the power consumed by the first or second controlled device at the maximum setting; wherein Pd is the difference between: (i) the measurement of the total average power used by both the first and second controlled devices at the present dim level, and (ii) the sum of the Pex values for the first and second controlled devices; wherein Pw is the percent of the present dim level multiplied by the value obtained by dividing the respective measurement of the power consumed by the first or second controlled device at the maximum setting by the sum of the measurements of the power consumed by the first and second controlled devices at the maximum setting; and wherein Ptw is the sum of the Pw values for the first and second controlled devices.

The present disclosure also provides for a control assembly wherein the first voltage detector includes an analog-to-digital converter, the analog-to-digital converter adapted to take a plurality of measurements of the voltage that is present at the analog-to-digital input during each cycle of the first line feed; wherein the analog-to-digital converter is adapted to communicate the measurements to the processor, the processor adapted to group the measurements into separate groups of measurements; wherein the processor is adapted to calculate the average voltage measurement of each group and determine if the average voltage measurement is positive or negative; wherein the processor is adapted to identify and analyze together consecutive groups of voltage measurements that have opposite positive/negative average voltage measurement values to estimate the voltage zero-crossing point of the first line feed's waveform.

The present disclosure also provides for a control assembly wherein each group of voltage measurements includes about twelve consecutive voltage measurements, each voltage measurement of each group taken about every 63 μs. The present disclosure also provides for a control assembly wherein when the processor analyzes the consecutive groups of voltage measurements that have opposite positive/negative average voltage measurement values, the processor is adapted to draw lines between pairs of individual voltage measurement points from each group to estimate the voltage zero-crossing point of the first line feed's waveform.

The present disclosure also provides for a control assembly wherein each group of voltage measurements includes about twelve consecutive voltage measurements; wherein the processor is adapted to draw lines between pairs of individual voltage measurement points from each group by first drawing a line between the first measurement point of the first group and the first measurement point of the second group, then drawing a line between the second measurement point of the first group and the second measurement point of the second group, then drawing a line between the third measurement point of the first group and the third measurement point of the second group, then drawing a line between the fourth measurement point of the first group and the fourth measurement point of the second group, then drawing a line between the fifth measurement point of the first group and the fifth measurement point of the second group, then drawing a line between the sixth measurement point of the first group and the sixth measurement point of the second group, then drawing a line between the seventh measurement point of the first group and the seventh measurement point of the second group, then drawing a line between the eighth measurement point of the first group and the eighth measurement point of the second group, then drawing a line between the ninth measurement point of the first group and the ninth measurement point of the second group, then drawing a line between the tenth measurement point of the first group and the tenth measurement point of the second group, then drawing a line between the eleventh measurement point of the first group and the eleventh measurement point of the second group, and then drawing a line between the twelfth measurement point of the first group and the twelfth measurement point of the second group.

The present disclosure also provides for a control assembly wherein after each line has been drawn between pairs of individual voltage measurement points, the processor is adapted to determine the voltage zero-crossing point of each drawn line and estimate the voltage zero-crossing point of the first line feed's waveform by analyzing the voltage zero-crossing point of each drawn line. The present disclosure also provides for a control assembly wherein the processor analyzes the median value of the voltage zero-crossing points of all the drawn lines to estimate the voltage zero-crossing point of the first line feed's waveform.

The present disclosure also provides for a control assembly wherein the processor is in communication with the first load control device via a first control signal line; wherein the processor is adapted to store a plurality of individual data points, each individual data point being a value that represents the magnitude of the control signal on the first control signal line that is generated for a different dim level of the first controlled device; and wherein the processor is adapted to calculate a magnitude of the control signal for a dim level of the first controlled device that is positioned between two data points of the plurality of data points.

The present disclosure also provides for a control assembly wherein the individual data points are spaced apart from one another from the low dim level to the high dim level of the first controlled device. The present disclosure also provides for a control assembly wherein the processor stores about thirty-three individual data points, each individual data point being spaced apart from one another from the low dim level to the high dim level of the first controlled device; and wherein the first nine data points proximal to the low dim level are spaced apart from one another by about 2% of the total number of dim levels of the first controlled device, and the remaining data points are spaced apart by about 3.5% of the total number of dim levels of the first controlled device.

The present disclosure also provides for a control assembly wherein the data points are generated manually by a user. The present disclosure also provides for a control assembly wherein the data points are generated by software associated with a light meter, the light meter configured and adapted to measure the light intensity of the first controlled device at a plurality of dim levels.

The present disclosure also provides for a control assembly further including a heat sink member mounted with respect to the first and second load control devices, the heat sink member having a baffle member; wherein the baffle member extends along at least a portion of the top surface of the heat sink member for thermal management purposes. The present disclosure also provides for a control assembly wherein the baffle member extends substantially along the length and width of the top surface of the heat sink member.

The present disclosure also provides for a control assembly further including a heat sink member and a printed circuit board mounted with respect to the first and second load control devices; wherein the first and second load control devices are each mounted substantially parallel with respect to the surface of the printed circuit board, the first and second load control devices positioned between the heat sink member and the printed circuit board. The present disclosure also provides for a control assembly further including a rear housing mounted with respect to the printed circuit board, the rear housing including at least one handle member that is movably and rotationally mounted with respect to the rear housing.

The present disclosure also provides for a method for estimating the power consumption of multiple loads including providing a load circuit, the load circuit including a plurality of load control devices, a current detector and a voltage detector, each load control device in communication with a controlled device; providing a processor in communication with each load control device, the current detector and the voltage detector; providing a line feed associated with the load circuit and in communication with each load control device, the current detector and the voltage detector, at least a portion of the line feed configured to travel to and be output by each load control device as a load output to its respective controlled device; running a calibration sequence via the processor, the calibration sequence turning on each controlled device separately and individually at multiple dim levels; providing to the processor for each dim level of each controlled device: (i) a current measurement from the current detector, and (ii) a voltage measurement from the voltage detector; calculating and storing, via the processor, a measurement of the average power consumed by each controlled device at each dim level by utilizing the respective current and voltage measurements of each controlled device at each dim level; operating each controlled device at a present dim level; and calculating the power consumption of each individual controlled device at the present dim level of each controlled device by utilizing the stored measurements.

The present disclosure also provides for a method for estimating the power consumption of multiple loads including providing a load circuit, the load circuit including a plurality of load control devices, a current detector and a voltage detector, each load control device in communication with a controlled device; providing a processor in communication with each load control device, the current detector and the voltage detector; providing a line feed associated with the load circuit and in communication with each load control device, the current detector and the voltage detector, at least a portion of the line feed configured to travel to and be output by each load control device as a load output to its respective controlled device; running a calibration sequence via the processor, the calibration sequence turning on each controlled device separately and individually at a maximum setting; providing to the processor for each maximum setting of each controlled device: (i) a current measurement from the current detector, and (ii) a voltage measurement from the voltage detector; calculating and storing, via the processor, a measurement of the power consumed by each controlled device at each maximum setting by utilizing the respective current and voltage measurements of each controlled device at each maximum setting; operating each controlled device at a present dim level; providing to the processor for each present dim level of each controlled device: (i) a current measurement from the current detector, and (ii) a voltage measurement from the voltage detector; calculating and storing, via the processor, a measurement of the total average power used by the controlled devices at the present dim level by utilizing the current and voltage measurements of the controlled devices at the present dim level; calculating, via the processor, the average power drawn at the present dim level by each individual controlled device by utilizing: (i) the measurements of the power consumed by the controlled devices at each maximum setting, (ii) the measurement of the total average power used by the controlled devices at the present dim level, and (iii) the percentage of the present dim level.

The present disclosure also provides for a method for estimating the power consumption of multiple loads wherein the average power drawn at the present dim level by each individual controlled device satisfies the equation:

$$Pload = Pex + \frac{Pw \times Pd}{Ptw};$$

wherein Pex is the percent of the present dim level multiplied by the respective measurement of the power consumed by each controlled device at the maximum setting; wherein Pd is the difference between: (i) the measurement of the total average power used by the controlled devices at the present dim level, and (ii) the sum of the Pex values for the controlled devices; wherein Pw is the percent of the present dim level multiplied by the value obtained by dividing the respective measurement of the power consumed by each controlled device at the maximum setting by the sum of the measurements of the power consumed by the controlled devices at the maximum setting; and wherein Ptw is the sum of the Pw values for the controlled devices.

The present disclosure also provides for a method for estimating the voltage zero-crossing point of the waveform of a line feed including providing a load circuit, the load circuit including at least one load control device and a voltage detector, the at least one load control device in communication with a controlled device, and the voltage detector including an analog-to-digital converter; providing a processor in communication with the at least one load control device and the voltage detector; providing a line feed associated with the load circuit and in communication with the at least one load control device and the voltage detector, at least a portion of the line feed configured to travel to and be output by the at least one load control device as a load output to its controlled device; measuring during each cycle of the line feed and via the analog-to-digital converter, a plurality of measurements of the voltage that is present at the analog-to-digital converter input; communicating the plurality of measurements to the processor; grouping, via the processor, the plurality of measurements into separate groups of measurements; calculating, via the processor, the average voltage measurement of each group; determining, via the processor, if the average voltage measurement is positive or negative; identifying and analyzing together, via the processor, consecutive groups of voltage measurements that have opposite positive/negative average voltage measurement values to estimate the voltage zero-crossing point of the line feed's waveform.

The present disclosure also provides for a method for estimating the voltage zero-crossing point of the waveform of a line feed wherein when the processor analyzes the consecutive groups of voltage measurements that have opposite positive/negative average voltage measurement values, the processor draws lines between pairs of individual voltage measurement points from each group to estimate the voltage zero-crossing point of the first line feed's waveform.

The present disclosure also provides for a method for generating a custom curve for a dimming signal including providing a load control device in communication with a controlled device; providing a processor in communication with the load control device via a control signal line; storing on the processor a plurality of individual data points, each individual data point being a value that represents the magnitude of the control signal on the control signal line that is generated for a different dim level of the controlled device; and calculating, via the processor, the magnitude of the control signal for a dim level of the controlled device that is positioned between two data points of the plurality of data points.

The present disclosure also provides for a control assembly including a load circuit, the load circuit including at least one load control device, the at least one load control device in communication with a controlled device; a processor in communication with the at least one load control device; and a first line feed associated with the load circuit and in communication with the at least one load control device; a heat sink member mounted with respect to the at least one load control device, the heat sink member having a baffle member; wherein at least a portion of the line feed is configured to travel to and be output by the at least one load control device as a load output to its controlled device; and wherein the baffle member extends along at least a portion of the top surface of the heat sink member for thermal management purposes.

The present disclosure also provides for a control assembly wherein the baffle member extends substantially along the length and width of the top surface of the heat sink member.

The present disclosure also provides for a control assembly further including a printed circuit board mounted with respect to the at least one load control device; wherein the at least one load control device is mounted substantially parallel with respect to the surface of the printed circuit board, the at least one load control device positioned between the heat sink member and the printed circuit board.

The present disclosure also provides for a control assembly further including a rear housing mounted with respect to the printed circuit board, the rear housing including at least one handle member that is movably and rotationally mounted with respect to the rear housing.

Additional advantageous features, functions and applications of the disclosed systems, assemblies and methods of the present disclosure will be apparent from the description which follows, particularly when read in conjunction with the appended figures.

BRIEF DESCRIPTION OF THE DRAWINGS

Exemplary embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

Figure 1:
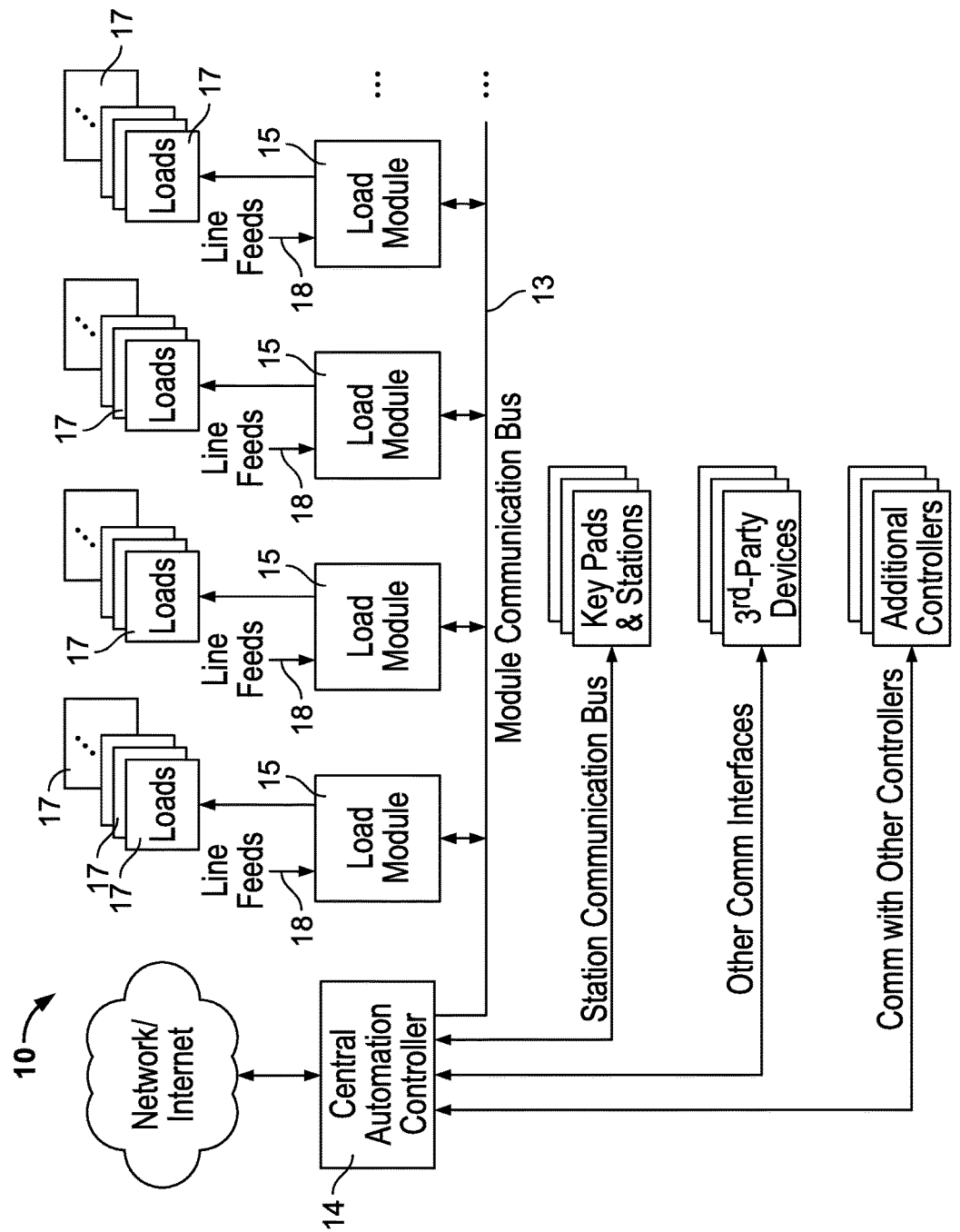
FIG. 1 is a partial block diagram of an exemplary embodiment of a control or automation system according to the present disclosure.

In the description which follows, like parts are marked throughout the specification and drawings with the same reference numerals, respectively. Drawing figures are not necessarily to scale and in certain views, parts may have been exaggerated for purposes of clarity.

The present disclosure provides improved dimming or dimmer assemblies/modules for controlling lights or loads (e.g., as part of a control or automation system). More particularly, the present disclosure provides for systems and methods for utilizing dimmer control assemblies/modules advantageously having: (i) an adjustable output response, (ii) enhanced thermal management, (iii) a voltage detector to determine amplitude and zero-crossing, and/or (iv) an estimation of power consumption for multiple loads (e.g., using a single sensor).

Current practice provides that some of the challenges that arise when designing/creating a dimming module/assembly can include implementing an accurate zero-crossing detector, producing an output that is substantially smooth as the level is adjusted, providing useful feedback to the user regarding the operating conditions such as power consumption of the loads, and/or managing the heat that is generated by the dimming modules or dimming circuits. For example and as noted above in the case of a lighting control, current practice provides that the turn-on timing typically should be consistent from cycle to cycle to ensure that the output does not have any substantial detectable variation when set to a specific level. As such, the method used to detect the zero-crossing typically should be accurate enough to avoid substantial errors in the turn-on that would cause a visibly detectable change in the output. Moreover, current practice also provides that some new load types generally have more unusual output characteristics than in the past when controlled by a dimmer module/assembly, and the output characteristics of these and other loads may have a response that is not able to be adequately corrected for by adding simple curvature to the dimming control signal.

In general, the present disclosure provides for improved dimmer control assemblies/modules having an adjustable output response, enhanced thermal management, a voltage detector to determine amplitude and zero-crossing, and/or an estimation of power consumption for multiple loads, thereby providing a significant commercial, operational and/or manufacturing advantage as a result.

Referring now to the drawings, and in particular to FIG. 1, there is illustrated a partial block diagram of an exemplary embodiment of a control or automation system 10 according to the present disclosure. For example, system 10 may be a home or commercial automation/control system or the like, although the present disclosure is not limited thereto. As shown in FIG. 1, control or automation system 10 typically includes master controller 14 (e.g., a central automation controller). In general, system 10 also includes at least one control assembly 15, and more particularly, typically includes a plurality of control assemblies 15 (e.g., four control assemblies 15).

Examples of suitable control assemblies 15 include, without limitation, dimmer assemblies/modules, electrical control devices, lighting controls, modules, relays, HVAC controls, motor controls, window treatment controls, security controls, temperature controls, water feature controls, media controls and/or audio/video controls or the like. It is noted that the master controller 14 may be the main central processing unit ("CPU") of the control or automation system 10, or it may be an access point to the automation system network. As noted, an exemplary control or automation system 10 of the present disclosure is depicted in FIG. 1. Other non-limiting exemplary control or automation systems for use with the assemblies and methods of the present disclosure are explained and described in U.S. Patent Publication No. 2009-0055760 to Whatcott et al., the entire contents of which is hereby incorporated by reference in its entirety.

In general, the master controller 14 may transmit command signals to control assemblies 15 (e.g., to processor 12—FIG. 2) to change the status of a controlled device or load 17 (e.g., to dim a light, and/or to turn a light on or off, etc.). Examples of suitable controlled devices 17 include, without limitation, lights, lighting equipment, electrical devices, loads, computers, processors, processing equipment, computing equipment, HVAC equipment, motors, shades, fans, outlets, security systems, electronics, electronic equipment, distributed audio systems, televisions and/or audio/video equipment or the like.

The master controller 14 may receive status signals from the control assemblies 15 regarding the status of a controlled device 17. In certain embodiments, at least one control assembly 15 includes a controllably conductive device, such as, for example, a relay or triac, to control power to a controlled device 17. In general, control assemblies 15 may be wall-box mounted or enclosure mounted. The control assemblies 15 may include control points, or the control points may be separate, such as, for example, a keypad. More particularly and as shown in FIG. 1, in addition to being in communication with at least one control assembly 15, the master controller 14 may be in communication with keypads and/or stations, third-party devices, and/or additional controllers, etc. Moreover, the controller 14 may be capable of communication with a network/internet, and may be capable of sending/receiving audio, video and/or data or the like.

Figure 2:
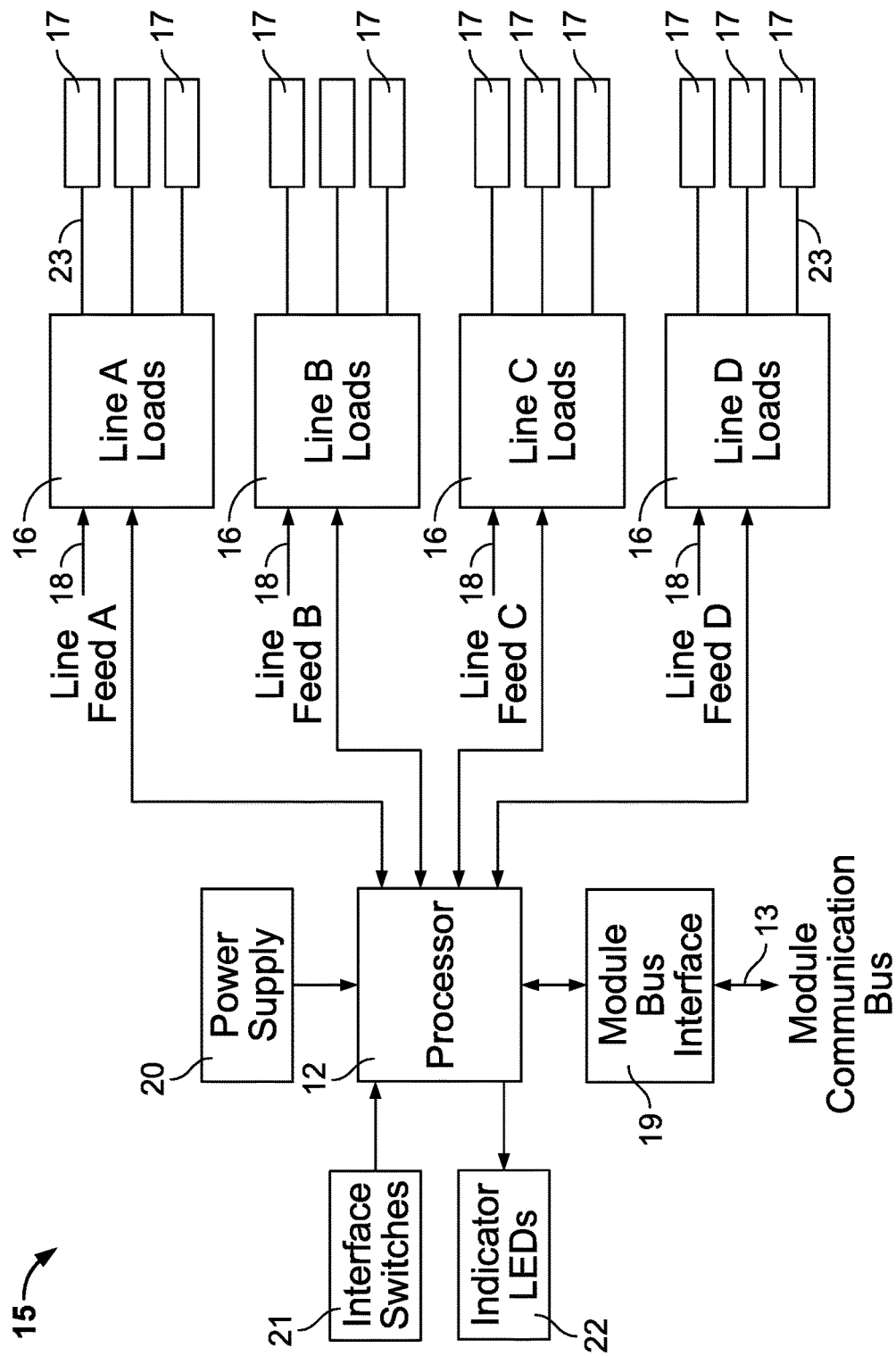
FIG. 2 is a partial block diagram of an exemplary embodiment of a dimmer module or assembly for use with the system of FIG. 1.

In general and as shown in FIGS. 1-6, at least one control assembly 15 of system 10 is a dimmer module/assembly 15. In exemplary embodiments, system 10 includes four dimmer modules/assemblies 15, although the present disclosure is not limited thereto. Rather, it is noted that system 10 may include any number of dimmer modules/assemblies 15 (e.g., one, two, three, four, a plurality, etc.). FIG. 2 shows a partial block diagram of an exemplary embodiment of a dimmer module/assembly 15 for use with system 10.

In general, dimmer module/assembly 15 is configured and adapted to control at least one controlled device 17 (e.g., at least one light or load). In exemplary embodiments and as discussed further below, dimmer module/assembly 15 of system 10 is configured and adapted to control at least twelve controlled devices 17 (e.g., at least twelve lights or loads) (FIG. 2). However, it is noted that dimmer module/assembly 15 of system 10 may be configured and adapted to control any number of controlled devices 17 (e.g., one controlled device, two controlled devices, four, a plurality, etc.).

In exemplary embodiments and as shown in FIG. 2, dimmer module/assembly 15 typically includes at least one processor 12. In general, processor 12 is in communication with a power supply 20. Processor 12 typically is in communication with master controller 14 (e.g., wired or wireless) for control purposes. For example, processor 12 may be in communication with master controller 14 over a communication line 13 (e.g., bus line) via interface 19 (e.g., module bus interface 19—FIG. 2) for control purposes. Processor 12 may also include and/or be in communication with switches 21 and/or indicators 22.

Figure 3:
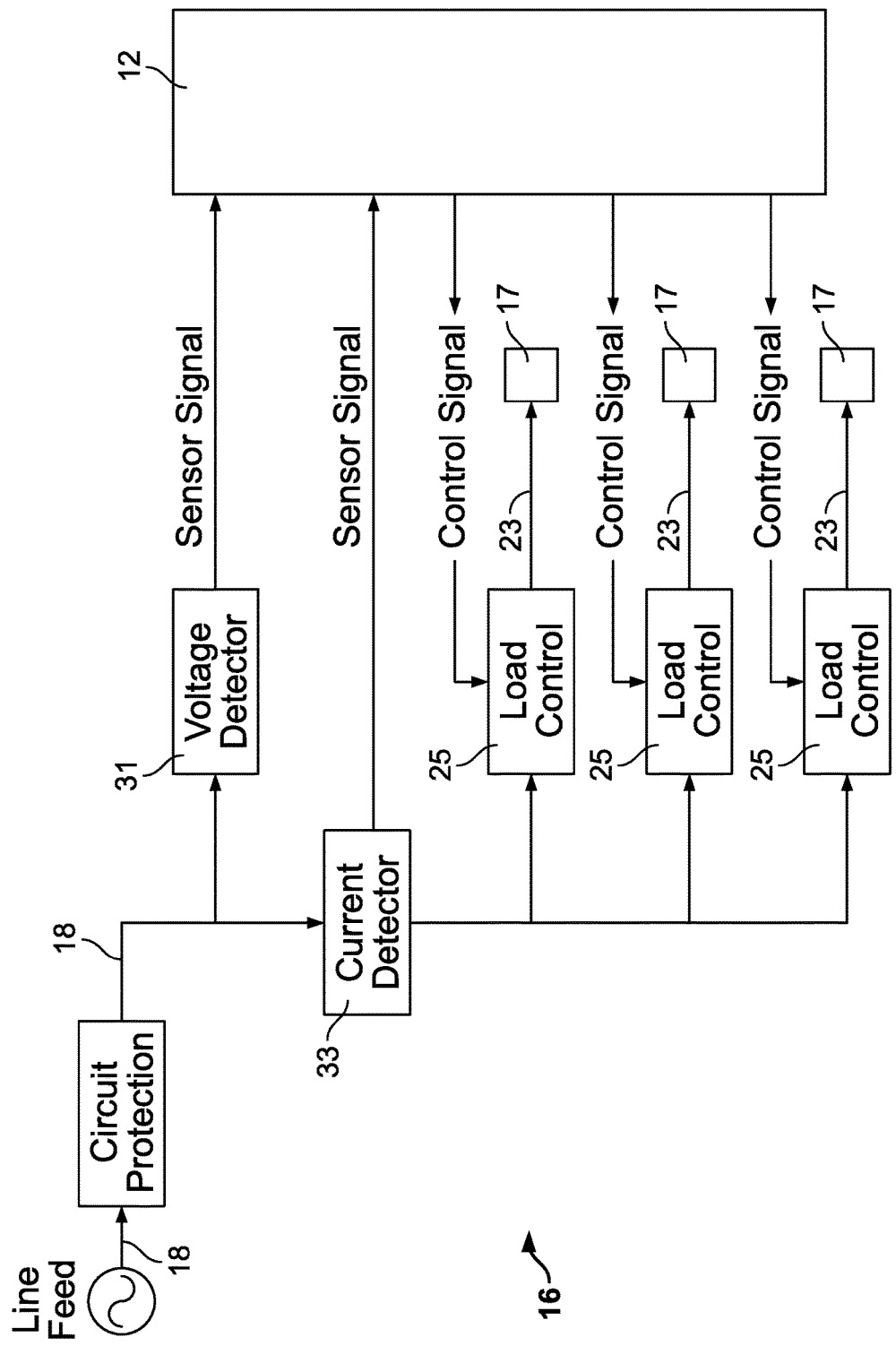
FIG. 3 is a partial block diagram of an exemplary embodiment of a load circuit of the system of FIGS. 1-2.

In general, processor 12 is in communication with (e.g., via control lines/signals) at least one load circuit 16. FIG. 3 depicts a partial block diagram of an exemplary embodiment of a load circuit 16 of dimmer module/assembly 15.

Figure 4:
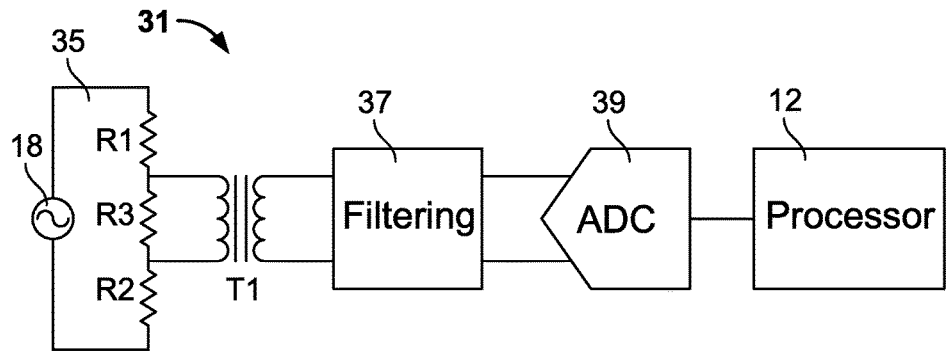
FIG. 4 is a partial block diagram of an exemplary embodiment of a voltage detector for use with the system of FIGS. 1-3.
Figure 5:
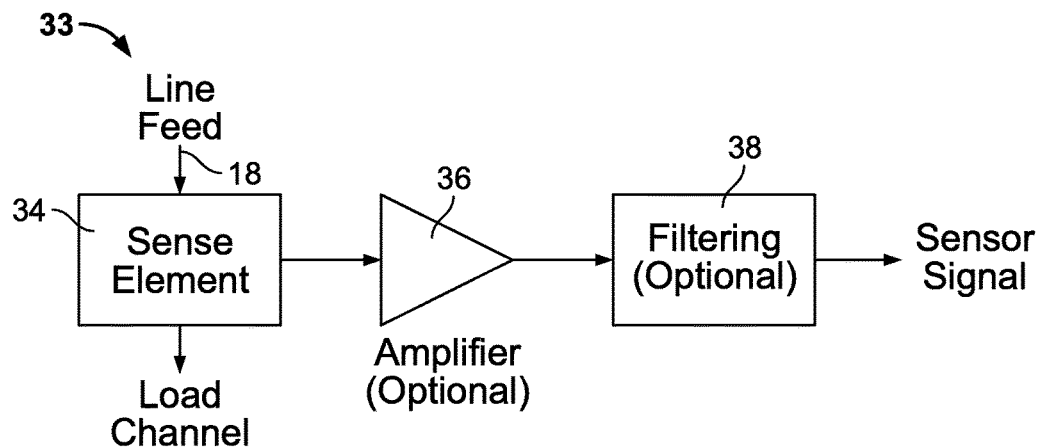
FIG. 5 is a partial block diagram of an exemplary embodiment of a current detector for use with the system of FIGS. 1-3.

In exemplary embodiments, processor 12 is in communication with four load circuits 16 (FIG. 2), although the present disclosure is not limited thereto. Rather, processor 12 may be in communication with any suitable number of load circuits 16. Load circuit 16 typically is associated and/or in communication with at least one line feed or power supply 18. With reference to FIGS. 3-5 and as discussed in further detail below, load circuit 16 typically includes a voltage detector 31 and a current detector 33.

In general, load circuit 16 includes at least one load output 23. In exemplary embodiments and as shown in FIGS. 2-3, load circuit 16 includes three load outputs 23 (e.g., line feed 18 has three load outputs 23), although the present disclosure is not limited thereto. Rather, load circuit 16 may include any suitable number of load outputs 23. Load output 23 typically is in communication with a controlled device 17 for control purposes.

Figure 6:
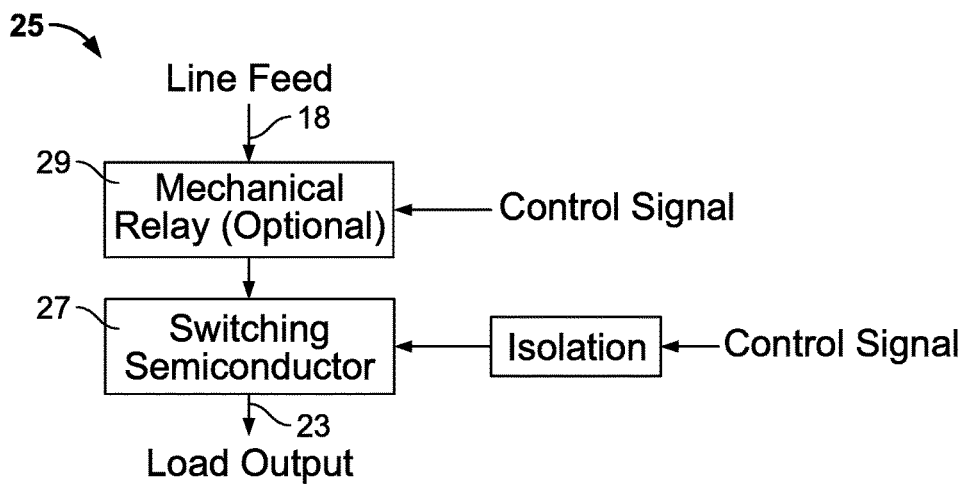
FIG. 6 is a partial block diagram of an exemplary embodiment of a load control device for use with the system of FIGS. 1-3.

As shown in FIGS. 3 and 6, load circuit 16 includes at least one load control device 25. In exemplary embodiments and as shown in FIG. 6, load control device 25 includes a switching device 27 (e.g., a switching semiconductor such as a triac, etc.). Load control device 25 may also include a mechanical relay 29 or the like.

In exemplary embodiments, load circuit 16 includes three load control devices 25, although the present disclosure is not limited thereto. Load circuit 16 may include any number of load control devices 25. In general, at least a portion of the line feed 18 of load circuit 16 travels to load control device 25 and is output as a load output 23 by load control device 25 (e.g., to device 17). Load control device 25 typically is in communication with processor 12 (e.g., via communication lines and/or control/status signals) for control purposes (e.g., for control of controlled device 17).

The present disclosure will be further described with respect to the following examples; however, the scope of the disclosure is not limited thereby.

EXAMPLE 1

Estimating Individual Load Consumption

As noted above and with reference to FIGS. 2-5, each load circuit 16 of each dimmer module/assembly 15 typically includes a voltage detector 31 and a current detector 33. In certain embodiments and also as noted above, each dimmer module/assembly 15 typically includes four load circuits 16, although the present disclosure is not limited thereto. As such, in exemplary embodiments, each dimmer module/assembly 15 typically includes four voltage detectors 31 and four current detectors 33 (e.g., one of each for each load circuit 16).

In other words, each load circuit 16 typically includes both a voltage detector 31 and a current detector 33 for its respective line feed 18 to allow for, inter alia, calculation of power consumption. As noted above, each load circuit 16 typically includes three load outputs 23 (e.g., each line feed 18 has three load outputs 23). Each load output 23 typically is in communication with a load or controlled device 17 for control purposes. As shown in FIG. 5, current detector/sensor 33 typically includes a current sensor member or element 34 (e.g., a resistor or hall-effect sensor or the like), an amplifier 36 and a filtering member 38.

In general, the voltage input typically will be substantially the same for each load output 23 on a line feed 18, so a single voltage detector or sensor 31 per line feed 18 is sufficient to accurately measure the voltage for each load output 23. However, each load output 23 on a line feed 18 can be using a different amount of current at any given moment, so a single current detector or sensor 33 typically can provide a direct measurement of the total current in all three load outputs 23, but not each load output 23 individually when they are all turned on. Additionally, the current drawn by a controlled device 17 (e.g., a light or load) attached to a load output 23 may vary depending on the type of controlled device 17 (e.g., on the load type) and/or on the dim level of the controlled device 17. It is noted that this problem could be solved by placing a current detector/sensor 33 or the like on each load 17, but this would quickly add cost to the assembly 15, and/or would take additional board space (e.g., PCB space) that may not be available.

In exemplary embodiments of the present disclosure, dimmer module/assembly 15 advantageously utilizes a single current detector/sensor 33 for each load circuit 16 to save cost and space. It is noted that a measurement of the current drawn by each individual load output is desired. In this regard, the systems, assemblies and methods of the present disclosure advantageously utilize the information from the single current detector/sensor 33 to accurately calculate an estimate of the individual load 17 values. In exemplary embodiments, these systems/methods are based on the concept of calibrating each load 17 by taking measurements while only one load or controlled device 17 at a time is turned on and then using this data to calculate the estimate.

For example, a purely resistive load or controlled device 17 presents a fixed impedance that does not substantially vary significantly due to external conditions. Since the impedance is generally fixed, the amount of current that will flow through it can be calculated based on the applied voltage. One measurement of the load output 23 current can be taken at a known voltage to determine the resistance and then that resistance can be used to calculate the current for other voltages. In the case of a sinusoidal voltage, the current can be measured at one point in the waveform, and that measurement can be used to determine the current at any other point in the waveform. The current through a controlled device 17 that presents a fixed impedance generally has the same amplitude at a given point in the cycle, regardless what dim level the device 17 is set on.

Figure 7:
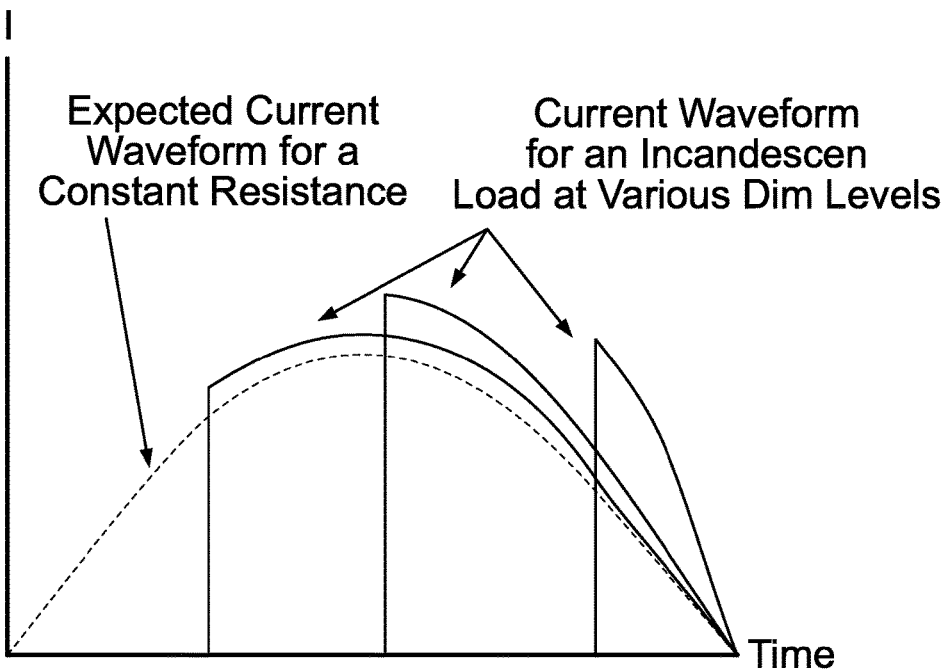
FIG. 7 shows an example of what the current looks like for different dim levels of a particular incandescent load versus a constant resistive load.

In general, one of the most common load types or controlled devices 17 is an incandescent bulb. An incandescent bulb generally is a resistive load, but the resistance typically varies significantly with temperature. It has been found that an incandescent bulb is sensitive enough to temperature that it will have a different resistance at different dimming levels. FIG. 7 shows an example of what the current looks like for different dim levels of a particular incandescent load versus a constant resistive load. In this case, taking a single measurement of the current is generally not enough to allow one to predict the current at all the dim levels.

Other practical examples of loads 17 that are becoming more common are dimmable compact-fluorescent light (CFL) and light-emitting diode (LED) bulbs. In general, these bulbs use electronic ballasts that often present a distorted current waveform when dimmed. These tend to be non-sinusoidal and also typically make it difficult to predict the current from a single measurement.

The following are advantageous methods to estimate the power consumed by the individual loads 17 using a single current detector/sensor 33 in load circuit 16.

Method 1:

In exemplary embodiments, a calibration sequence is run by processor 12 after the loads 17 are connected (e.g., after a load or controlled device 17 is connected to each load output 23 of load circuit 16). For example, the calibration sequence turns on each load 17 separately and/or individually (e.g., while all the other loads 17 are turned off or are not turned on) at multiple dim levels from low to high (e.g., about eight different dim levels), and processor 12 then stores a measurement of the average power consumed by each load 17 at each of these dim levels. At each dim level (and for each load 17 individually), the current measurements are provided by the current detector 33, and the voltage measurements are provided by the voltage detector 31. The current and voltage measurements are then utilized by processor 12 to calculate the average power consumed by each load 17 at each of the dim levels.

These stored power measurements/levels then form a calibration table for each load 17. When a load 17 is in operation, its respective stored data can then be used (e.g., by processor 12) to calculate and/or interpolate the power consumption of the load 17 at the actual dim level that is being used at the moment.

Figure 8:
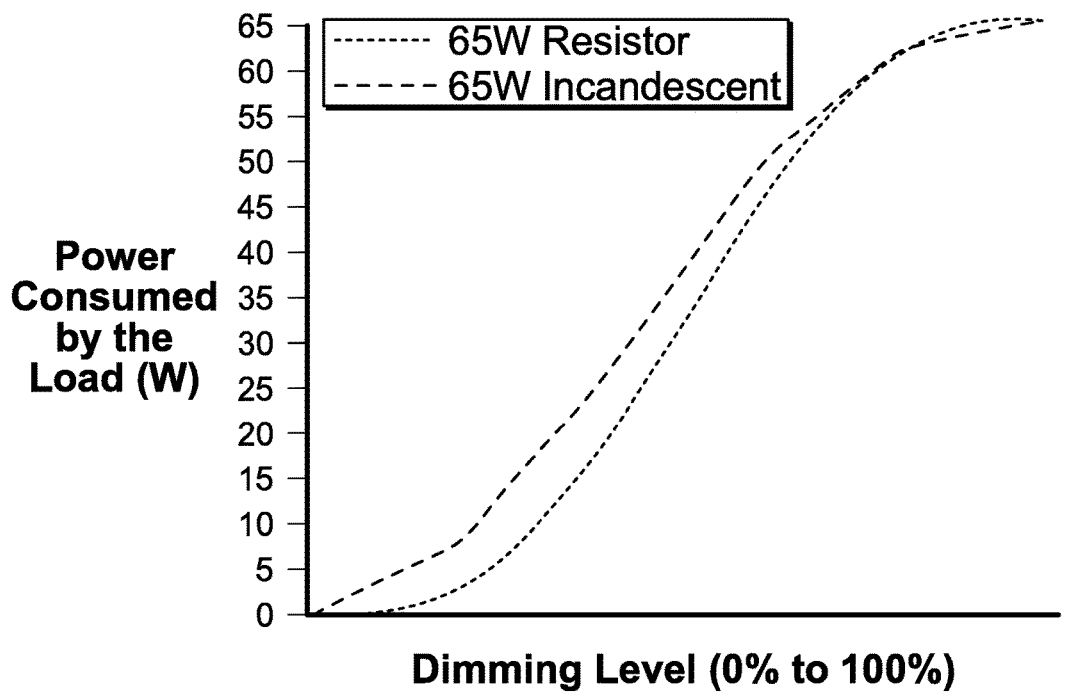
FIG. 8 is a graph showing power consumed by the load versus dimming level for a resistive 65 W load and a 65 W incandescent bulb.

In exemplary embodiments, storing a plurality (e.g., about eight) different points/measurements of power drawn, with each point/measurement being substantially evenly-spaced apart from one another at differing dim levels, has been found sufficient to provide a very accurate estimate of power consumption of the load 17 at the actual dim level that is being used at the moment. For the loads that were tested, the response was curved near the beginning and the end of the dim settings, and was substantially linear or straight in the middle of the dim settings (FIG. 8). As such, it is noted that the accuracy can be increased by either adding more points or distributing the points so that there are more points near the ends than in the middle of the dim settings. FIG. 8 shows the difference between a resistive 65 W load and a 65 W incandescent bulb.

Method 2:

This method estimates the average power drawn for a single load using a single calibration measurement for the load, the dimming level for the load, and a measurement of the total average power used by all of the loads connected to a single current detector 33 including the load for which power is being estimated. The calibration measurement is performed after the loads 17 are connected. It is measured for each load output 23 of circuit 16 set to a level of full on one at a time. The average power measurements are obtained by using the measurements from the current detector 33 and voltage detector 31. For reference, the average power may be calculated by measuring the instantaneous current and voltage at multiple (may be 12) points spaced evenly over the period of a half cycle (for AC power); multiplying the current and voltage measurements at each point to obtain a set of instantaneous power measurements; and then taking the average of the instantaneous results by dividing by the number of points (12 in this case).

In exemplary embodiments, when the dimmer module 15 is in normal operation, the average power for each load 17 can be estimated by a novel calculation that uses the calibration data along with the dimming level for each load 17 and the total average power measured for the loads 17 connected to a single current sensor 33. In general this method provides for a faster calibration process and requires less memory storage on processor 12 since only one calibration calculation needs to be made and stored for each load, and the calibration calculation typically only requires measurements made at a single dimming level. This method, however, can be less accurate when compared to Method 1 described above. The novel calculation is shown below in Equation 1.

$$Pload = Pex + \frac{Pw \times Pd}{Ptw} \qquad \text{Equation 1}$$

Where Pload, the result of the calculation, is the average power used by one particular load 17, and the other parameters are obtained as follows.

Pex

This is the calculated average power that would be consumed if the load was a fixed resistive load dimmed at the level that the actual load is currently being dimmed at. It is calculated using the calibrated power measurement along with the dimming level using the following Equation 2:

$$Pex = DimPercent \times Pcal \qquad \text{Equation 2:}$$

Where Pcal is the calibrated value that has been stored for this load as described above, and DimPercent is the percentage of the available input signal that is being output to the load by the dimmer.

Pd

This is the difference between the total measured power (Ptm) for all of the loads connected to a single current detector and the sum of the values of Pex for each of the loads connected to that current detector.

Pw

This is a weighted value for this load calculated using the following Equation 3:

$$Pw = DimPercent \times PcalPercent \qquad \text{Equation 3:}$$

Where DimPercent is the same as described above and PcalPercent is value of Pcal for this load divided by the sum of the values of Pcal for all the loads connected to this current detector.

Ptw

This is the sum of the values of Pw for each of the loads connected to this current detector.

Example Calculation:

As an example suppose there are three loads that are each dimmed at 50% connected to a single current detector. The loads are all incandescent light bulbs where Load1 is a 300 W rated bulb, Load2 is 60 W rated bulb, and Load 3 is a 40 W rated bulb. First, we measure Pcal for each load and get the following:

Pcal1=287

Pcal2=58

Pcal3=39

With all the loads turned on and dimmed to 50%, we measure Ptm to be 224.5.

Next, we calculate the value of Pex for each load.

$$Pex1=0.5*287=143.5$$

$$Pex2=0.5*58=29$$

$$Pex3\ 0.5*39=19.5$$

Calculate Pd.

$$Pd=Ptm-(Pex1+Pex2+Pex3)=224.5-(143.5+29+19.5)=32.5$$

Calculate Pw for each load.

$$Pw1=0.5*Pcal1/(Pcal1+Pcal2+Pcal3)=0.5*287/(287+58+39)=0.374$$

$$Pw2=0.5*Pcal2/(Pcal1+Pcal2+Pcal3)=0.5*58/(287+58+39)=0.076$$

$$Pw3=0.5*Pcal3/(Pcal1+Pcal2+Pcal3)=0.5*39/(287+58+39)=0.051$$

Calculate Ptw.

$$Ptw=Pw1+Pw2+Pw3=0.374+0.076+0.051=0.501$$

Then the final calculation gives the average power for each load as, $$Pload1=143.5+0.374*32.5/0.501=167.8$$

$$Pload2=29+0.076*32.5/0.501=33.9$$

$$Pload3=19.5+0.051*32.5/0.501=22.8$$

For comparison, the actual measured power for each load in this case was:

$$Pactual1=171$$

$$Pactual2=35.5$$

$$Pactual3=24$$

EXAMPLE 2

Voltage Detector to Determine Amplitude and Zero-Crossing

As noted above and with reference to FIGS. 2-5, each load circuit 16 of each dimmer module/assembly 15 typically includes a voltage detector 31 and a current detector 33. In other words, each load circuit 16 typically includes both a voltage detector 31 and a current detector 33 for its respective line feed 18 to allow for, inter alia, calculation of power consumption. As noted above, each load circuit 16 typically includes three load outputs 23 (e.g., each line feed 18 has three load outputs 23). Each load output 23 typically is in communication with a load or controlled device 17, e.g., a dimmable light, for control purposes.

In exemplary embodiments and as shown in FIGS. 3-4, voltage detector 31 on line feed 18 of dimmer module/assembly 15 allows one to detect the amplitude of the voltage for a given line feed 18. It is also noted that it is useful to determine the zero-crossing from this same voltage detector 31. FIG. 4 is a partial block diagram of an exemplary embodiment of a voltage detector 31 for use with the system of FIGS. 1-3.

In exemplary embodiments and as shown in FIG. 4, resistors R1, R2, and R3 of voltage detector 31 operate as a voltage divider and current limiter 35. This allows for the use of a physically small transformer T1 that is low-current and typically does not require a high primary to secondary turns ratio for the winding. In general, the output of the transformer T1 can be fed through a filter circuit 37 and then into an analog-to-digital converter (ADC) 39. Next, the digital data is processed (e.g., via processor 12) to determine the amplitude and zero-crossing.

In exemplary embodiments, the amplitude of the voltage for a given line feed 18 can be determined by testing the circuit to find the ratio of the input line feed 18 voltage to the voltage that is present at the ADC 39 input. This ratio can be used as a multiplier to calculate the line feed 18 voltage. This amplitude measurement is useful for diagnostic purposes as well as in calculating power consumption for the line feed 18.

In general, accurately detecting the voltage zero-crossing point of the power supply's (e.g., line feed 18) waveform is useful in AC dimming circuits. For example, it is used to keep the dimming signal synchronized with the alternating line feed 18 voltage. The voltage detector 31 circuit described provides an isolated and scaled-down representation of the line feed 18 voltage. In general, the ADC 39 is configured and adapted to take many sample measurements of the voltage that is present at the ADC input during each cycle of the line feed 18. These sample measurements may then be broken down into groups (e.g., one group is 12 samples, with one sample taken about every 63 µs), and then further analyzed. One exemplary process (e.g., via processor 12) is as follows:
1) Take the average of each group of sample measurements to determine if the average is higher or lower than zero (positive or negative).
2) Continue until a group of samples has an average value that is opposite (e.g., positive or negative) from the previous group. For example, the previous group's average was higher than zero and the current group's average is lower than zero.
3) If the group sizes are large enough (e.g., about 12 samples per group), then a transition of the average as described in step 2 above indicates that a zero crossing occurred within those two groups of samples.
4) Analyze the individual samples in the two groups from step 2 above to determine the zero-crossing point.

One exemplary implementation configures/adapts the ADC 39 to take one sample of the voltage that is present at the ADC input about every 63 µs, and uses groups of 12 samples. It has been found, after much experimentation and calculation, that this method provided excellent performance without requiring too much processing time. In addition, the direct-memory-access ("DMA") function of the processor or microcontroller 12 can advantageously be utilized to transfer the sample measurements directly to memory storage of processor 12 to await processing via the processor 12.

Several investigations were completed for performing step 4 above (analyzing the individual samples in the two groups to determine the zero-crossing point). One successful approach was to program the processor 12 to draw lines between pairs of points in the sample set and interpolate the zero-crossings for the lines. This gives a group of zero-cross estimates that can be analyzed to choose the likely zero-cross point. Many combinations for the pairs were attempted, including, without limitation, the following:
 A) Start with the first point in a group and create pairs with all the other points in that group, then move to the next point of that group and continue this way all the way through the set of points in that group. For example and with reference to FIG. 9, lines would first be drawn between point 1 and point 2, point 1 and point 3, point 1 and point 4, point 1 and point 5, and then point 1 and point 6. Next, lines would be drawn between point 2 and point 1, point 2 and point 3, point 2 and point 4, point 2 and point 5, and point 2 and point 6. This method would continue in a similar manner for points 3 through 6.

B) Start with the first and last points of a group and work inward pairwise toward the middle two points of that group. For example and with reference to FIG. 9, a line would be drawn between point 1 and point 6, between point 2 and point 5, and between point 3 and point 4.

Figure 9:
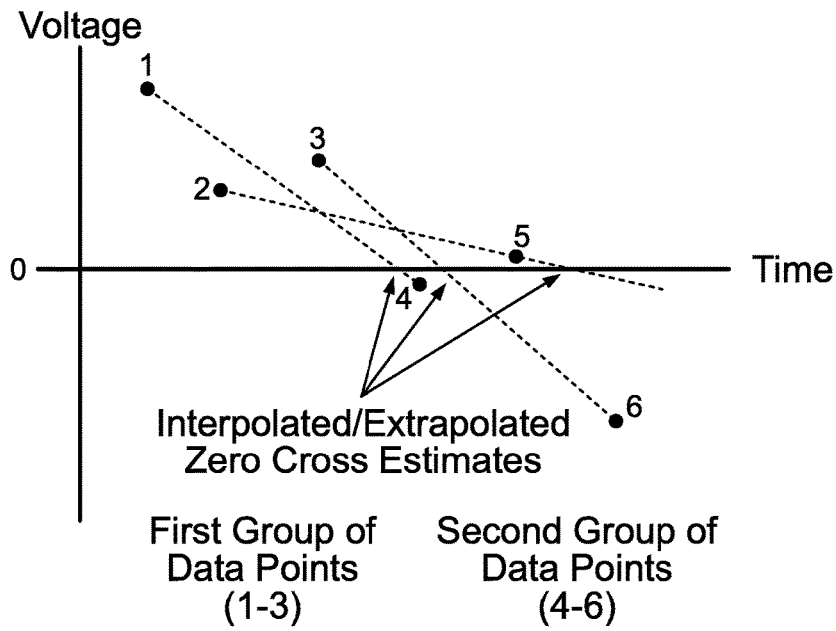
FIG. 9 is a graph illustrating the sequential lines method for estimating the voltage zero-crossing of a line feed, by utilizing an exemplary voltage detector of the present disclosure.

C) The Sequential Lines Method: Using the two groups start with the first point in each group (the first point from the first group and the first point from the second group, or the first point overall and the first point after the middle point overall) and work pairwise from beginning to end of each group. In other words and as shown in FIG. 9, lines are drawn between points 1 and 4, 2 and 5, and 3 and 6.

As noted, Method C above is called the sequential lines method. During testing, the sequential lines method performed better than the other line-drawing methods (e.g., better than Methods A and B noted above). An example drawing of the sequential lines method is shown in FIG. 9, illustrated with 6 total points (3 pairs/lines of points).

After determining the zero-crossing estimate for each line drawn between two points, the group of estimates can be used to determine where the actual zero-cross of the AC supply occurred. In one embodiment, the average of the zero-crossings of all of the drawn lines is used as the estimate of the zero-cross of the AC supply. In another embodiment, the median of the zero-crossings of all of the drawn lines is used as the estimate of the zero-cross of the AC supply.

In exemplary embodiments, an oscilloscope can be used to measure the amount of variation between the final estimate of the zero-cross and the actual zero-cross of the signal. It has been found that taking a median of the zero-crossings of the drawn lines, as opposed to an average, improves the accuracy of the result, e.g., there is less measured variation between the median and the actual zero-cross of the AC supply than between the average and the actual zero-cross. By nature, the median ignores situations where a single point (or small number of points compared to the total number) is significantly in error.

Another investigation that was completed for performing step 4 above (analyzing the individual samples in the two groups to determine the zero-crossing point) included using a least squares calculation. The least squares method performed well, but it was not quite as accurate as the sequential lines method discussed above, for the conditions tested. In one test, the least squares calculation had about 58 μs of measured variation compared to about 51 μs of measured variation for the sequential lines method.

EXAMPLE 3

Adjustable Output-Response Curve

As noted above, current practice provides that some new load types generally have more unusual output characteristics than in the past when controlled by a dimmer module/assembly, and the output characteristics of these and other loads may have a response that is not able to be adequately corrected for by adding simple curvature to the dimming control signal.

For example, to generally provide high quality dimming, some dimmer modules have incorporated therein a trim and/or linearization value. The trim value typically allows the dimming range to be adjusted so that the dimming signal stays out of areas near the high and/or low end (e.g., areas that typically do not change the output). If the lighting load normally does not turn on until the control signal level is increased beyond about 10%, then the trim value can generally be set to about 10% on the low end. This typically causes the control signal to start from about 10% as the lowest dim setting, and then all other dimming steps are typically divided up between about 10% and about 100%, instead of the original 0% to 100%.

Figure 10:
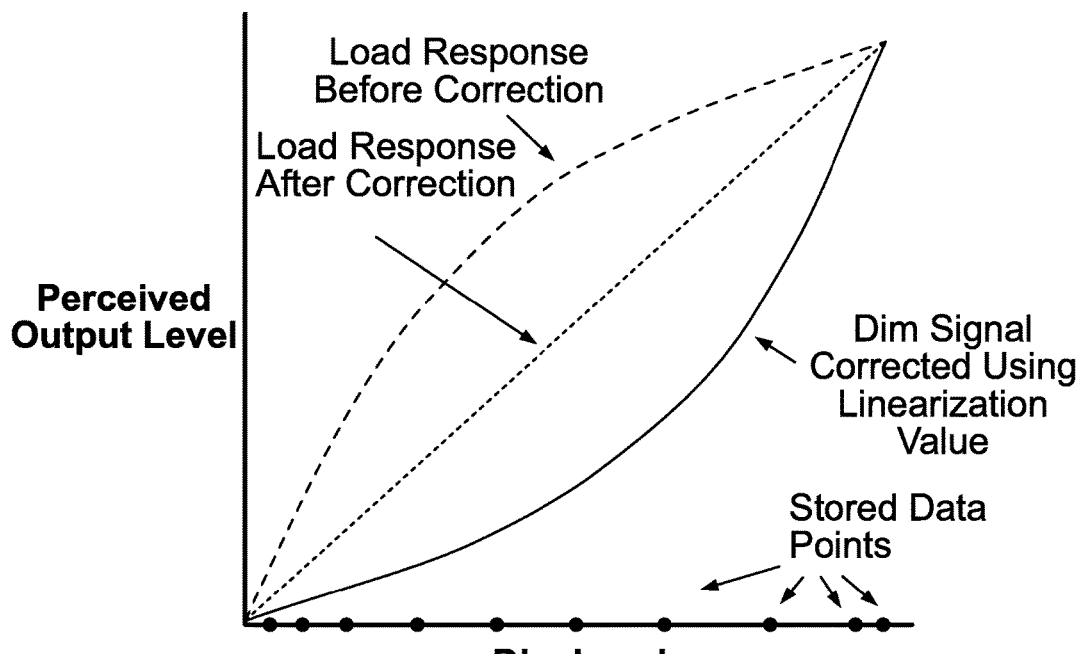
FIG. 10 is a graph illustrating an exemplary load response before and after correction, and an exemplary dim signal corrected using a linearization value.

In general, the linearization value allows the control signal to be adjusted so that it varies in a non-linear fashion. This typically allows the output to be adjusted to try to match a substantially smooth response for the human eye. Some manufacturers use a method that causes the linearization value to adjust the control signal by introducing some amount of curvature to its output over the dimming range. In general, increasing and decreasing the linearization value affects how extreme the curvature is. On some dimmer assemblies/products, about ten data points are taken from the desired curve and programmed into the dimmers by the main controller. This typically keeps the storage space for the curve data fairly low, but generally means that the resolution of the actual curve used by the dimmers may be limited. To help with this, more of the data points may be located near the beginning and end of the curve where more detail is often required with common load types. See, e.g., FIG. 10.

Figure 11:
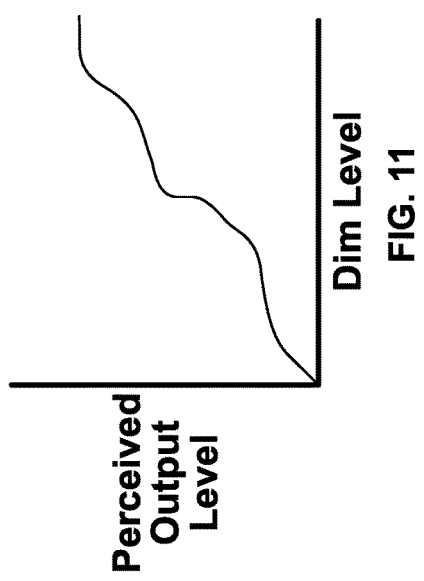
FIG. 11 is a graph illustrating an output of an exemplary load that has an irregular output response.

However, some new load types have more unusual output characteristics than in the past when controlled by a dimmer module/assembly. For example, these include compact-fluorescent lights (CFL) and light-emitting diodes (LED). The output characteristics of these and other loads may have a response that is not able to be adequately corrected for by adding simple curvature to the dimming control signal, as some have accomplished with a linearization value. Moreover, the response may also vary to an extent that about ten data points is no longer generally sufficient to describe a curve to correct it. For example, the output of such a load may look like that as shown in FIG. 11.

In exemplary embodiments, the present disclosure provides for a new linearization scheme that can compensate for loads with irregular output responses. In one embodiment, a table of about thirty-three (33) data points is utilized to describe the shape of the dimming control signal as it varies from low to high (dim level). It has advantageously been found that having about this many data points (e.g., about thirty-three) gives one the resolution to compensate for very extreme load responses.

In exemplary embodiments, about the first nine or so data points may be positioned/measured closer together as compared to the remainder of the data points, in order to provide extra precision on the low end. It is noted that more data points (greater than about 33 data points) can be utilized if desired, although adding more data points to the linearization scheme adds additional storage on the dimmer module/assembly 15 (e.g., on processor 12), and/or on system 10 (e.g., on master controller 14).

In exemplary embodiments, each data point is a 16-bit value that represents the magnitude of the control signal that should be generated for the dim level corresponding to that data point. In general, the dimmer module/assembly 15 utilizes interpolation (e.g., via processor 12) to estimate the desired control signal output for dim levels that fall between the data points.

Figure 12:
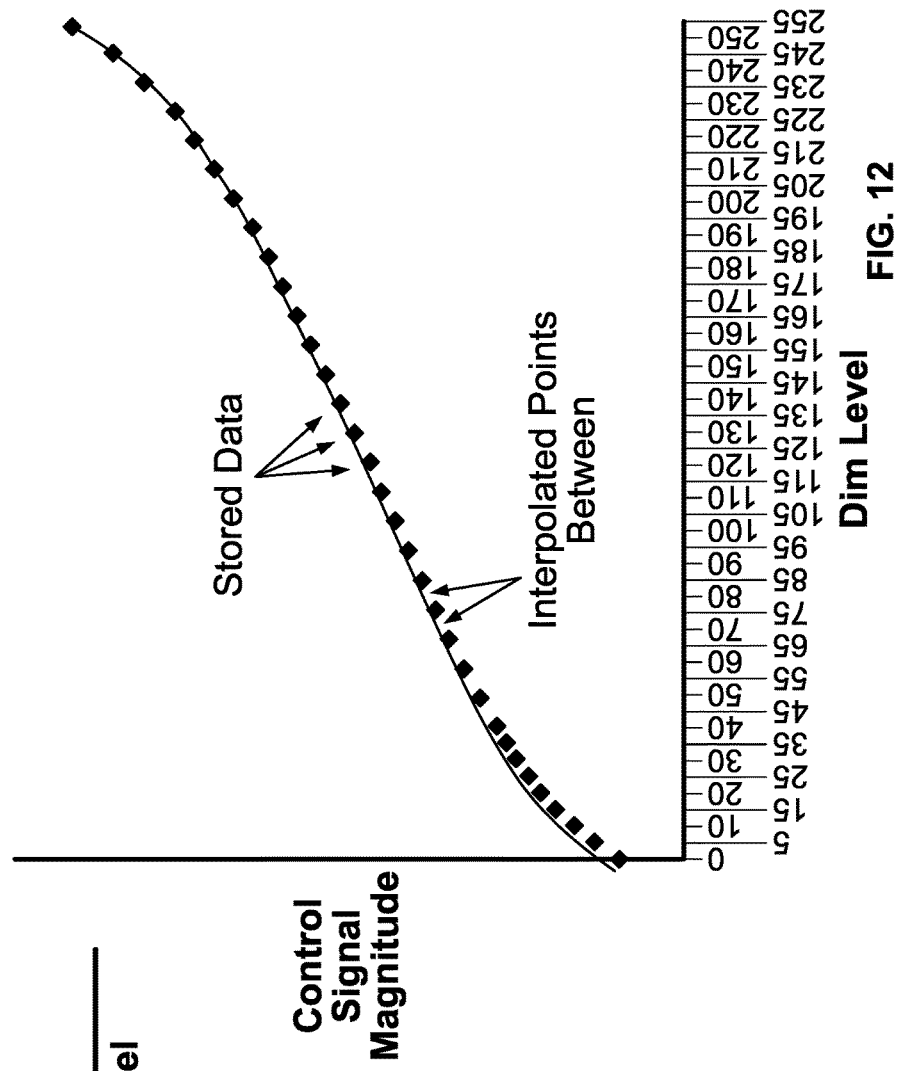
FIG. 12 shows an exemplary linearization scheme that can compensate for loads with irregular output responses, the linearization scheme having 255 dimming levels.

FIG. 12 shows an exemplary linearization scheme that can compensate for loads with irregular output responses, the linearization scheme having 255 dimming levels. In one embodiment and as shown in FIG. 12, the first nine data points are spaced apart by about 2% of the total number of dimming levels and the remaining data points are spaced apart by about 3.5% of the total number of dimming levels. In this embodiment, the first nine points are spaced about five dim level steps apart, and the remaining points are spaced about nine dim level steps apart.

It is noted that one can still use these data points to describe a simple curved correction, but now a user can also create a table of data points to describe a more complex curve that can be used to correct a load that provides an arbitrary response. For example, this table of data points can be generated manually by viewing the appropriate output of a load (e.g., intensity of a light), manually adjusting the values stored in the relevant table(s) in the controller software, and then checking the result.

Figure 13:
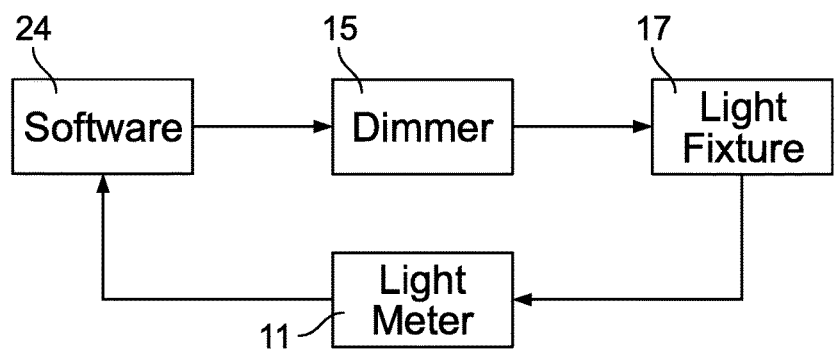
FIG. 13 is a partial block diagram of an exemplary embodiment of a light meter for use with a dimmer module/assembly according to the present disclosure.

Another option is to automate the process of generating the linearization data for a load 17 (e.g., a light fixture) using software 24 to control a light meter 11 and a dimmer module/assembly 15, as shown in FIG. 13. Software 24 is typically utilized by a separate processor or the like (e.g., separate from processor 12). However, it is noted that master controller 14 may utilize software 24 as discussed below.

In exemplary embodiments, the process has two basic steps. First, the software 24 gathers data about the output response of the light fixture 17. Second, the software 24 compares this data to the desired response and generates a linearization table that will achieve the desired response.

The first step of gathering the data can be accomplished by setting the dimmer output to multiple levels from 0% to 100%. The output signal of the dimmer in this case should be linear as it is varied. At each dim level, the software 24 stores a measurement of the light intensity taken by the light meter 11. This provides the software 24 with the response of the light fixture 17 to a linear drive signal.

The second step of generating the linearization data is accomplished by first choosing a desired response (e.g., a desired light intensity). Then, the data for the measured response of the fixture 17 gathered in the first step is compared to the desired response. The software 24 checks the high and low end of the measured response to see if any trimming is required. The first and last points of the linearization table are set based on any trimming that is required. The remaining points are generated to compensate for any differences between the desired output and the measured output. For example, if the measured value at a particular point is higher than the desired output, then the linearization value for that point is set to output a dimming signal that is lower than what was used when the measurement was taken.

For example, this setup can be used in a lab or the like to generate linearization tables for various loads 17, and these tables can be kept in a library and/or database (e.g., electronic database). The library could then be shared with installers. This method could also be used by the installer themselves by providing them with the hardware and software required to take the measurements. This would allow the installer to tune the response of the load 17 during commissioning of the system 10.

Thus, the above disclosure describes another option for generating a non-linear curve for the dimming signal that provides a smooth, linear or near-linear transition in the load output (e.g., light intensity) by inputting the linearization values into the software (e.g., into processor 12 and/or master controller 14). Currently, a user can enter a single parameter (e.g., an integer from 1 to 100) that the software then inputs into a mathematical function to produce a set table of data points that define the curve. The present disclosure describes a novel alternative by which a user can create a custom table of data points that define a curve that is more detailed in its shape. The single parameter option is advantageously simple and quick and allows for adequate correction to be applied in many cases. The custom table method advantageously allows for finer control and correction of irregular load outputs.

EXAMPLE 4

Thermal Management

In general, the present disclosure provides for improved dimmer control assemblies/modules having enhanced thermal management. In exemplary embodiments, the present disclosure provides for systems/methods for improving the power-handling capability of multiple dimming modules 15 mounted in an enclosure (e.g., a vertical enclosure) by enhancing the performance of the thermal management.

Figure 14:
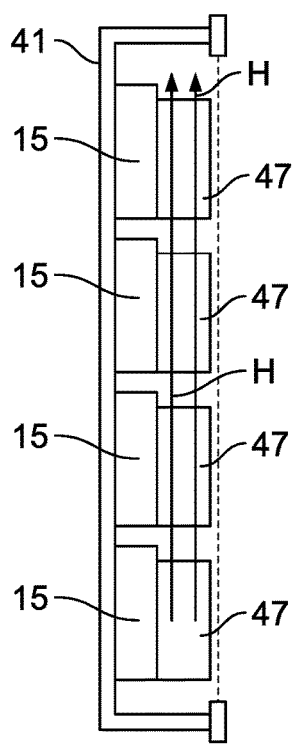
FIG. 14 is a side view of an exemplary enclosure housing four control assemblies, the control assemblies not including a baffle member.

As noted above and as depicted in FIGS. 14-15, control assemblies 15 (e.g., dimmer modules/assemblies 15) may be mounted/housed at least partially within an enclosure 41. FIG. 14 depicts four control assemblies 15 mounted within vertical enclosure 41. It is noted that enclosure 41 may house/contain any number of control assemblies 15 and/or master controllers 14 of system 10 (e.g., one, two, four, a plurality, etc.).

As shown in FIG. 14, each control assembly 15 does not include a baffle member 43. As such, at least some of the hot/warm air (depicted by arrows H) generated from the lower assemblies 15 rises substantially directly from the lower assemblies 15 to the upper assemblies 15, and generally decreases the cooling efficiency of the heat sinks 47 on the upper assemblies 15.

Figure 15:
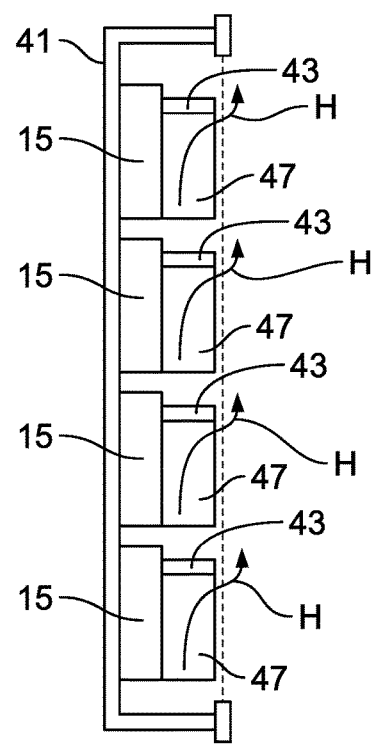
FIG. 15 is a side view of an exemplary enclosure housing four control assemblies, the control assemblies including a baffle member.

In certain embodiments and as shown in FIG. 15, each control assembly 15 (e.g., dimmer module/assembly 15) housed within enclosure 41 includes at least one baffle member 43. In general, each control assembly 15 includes one baffle member 43, although the present disclosure is not limited thereto.

Figure 19:
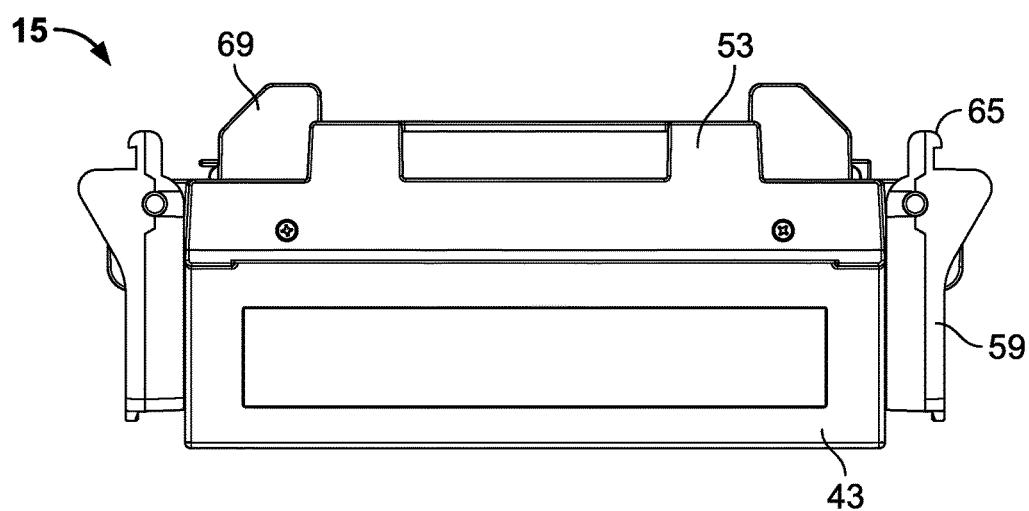
FIG. 19 is a top view of the dimmer module/assembly of FIG. 17.
Figure 20:
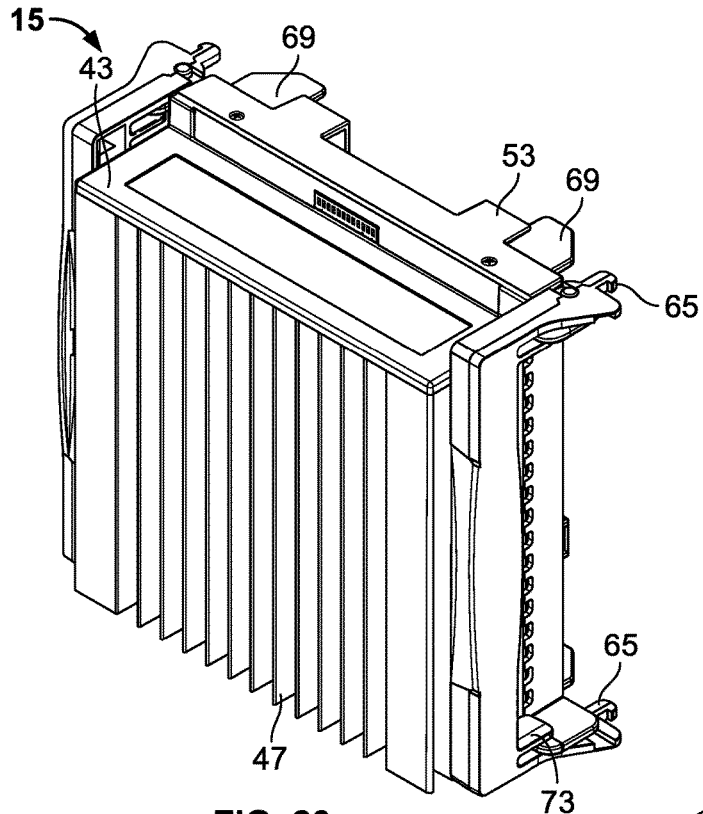
FIG. 20 is a front perspective view of the dimmer module/assembly of FIG. 17.
Figure 21:
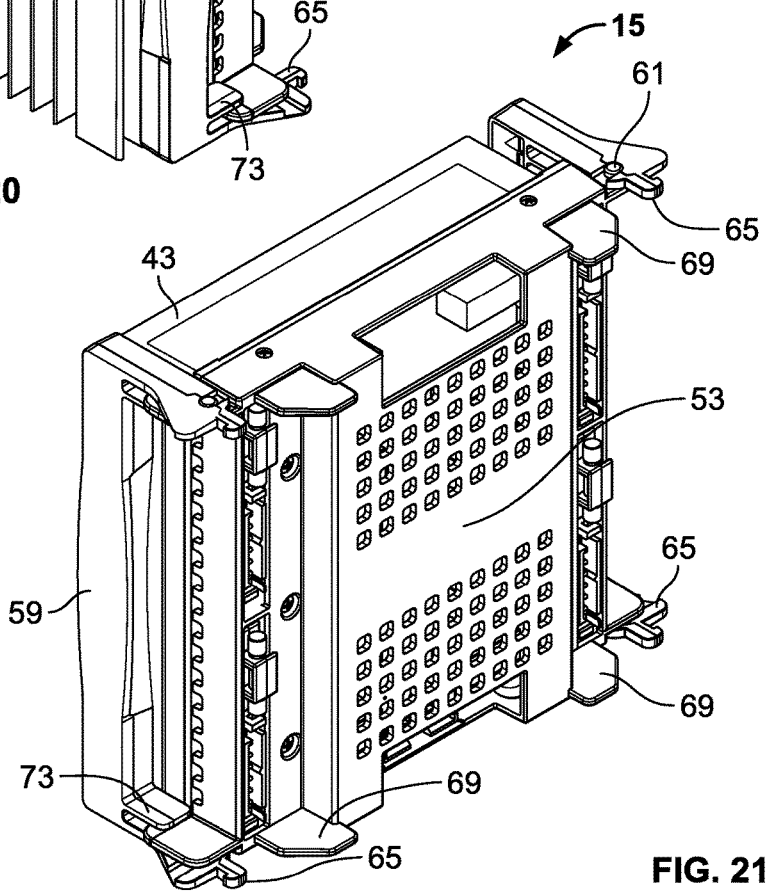
FIG. 21 is a rear perspective view of the dimmer module/assembly of FIG. 17.
Figure 22:
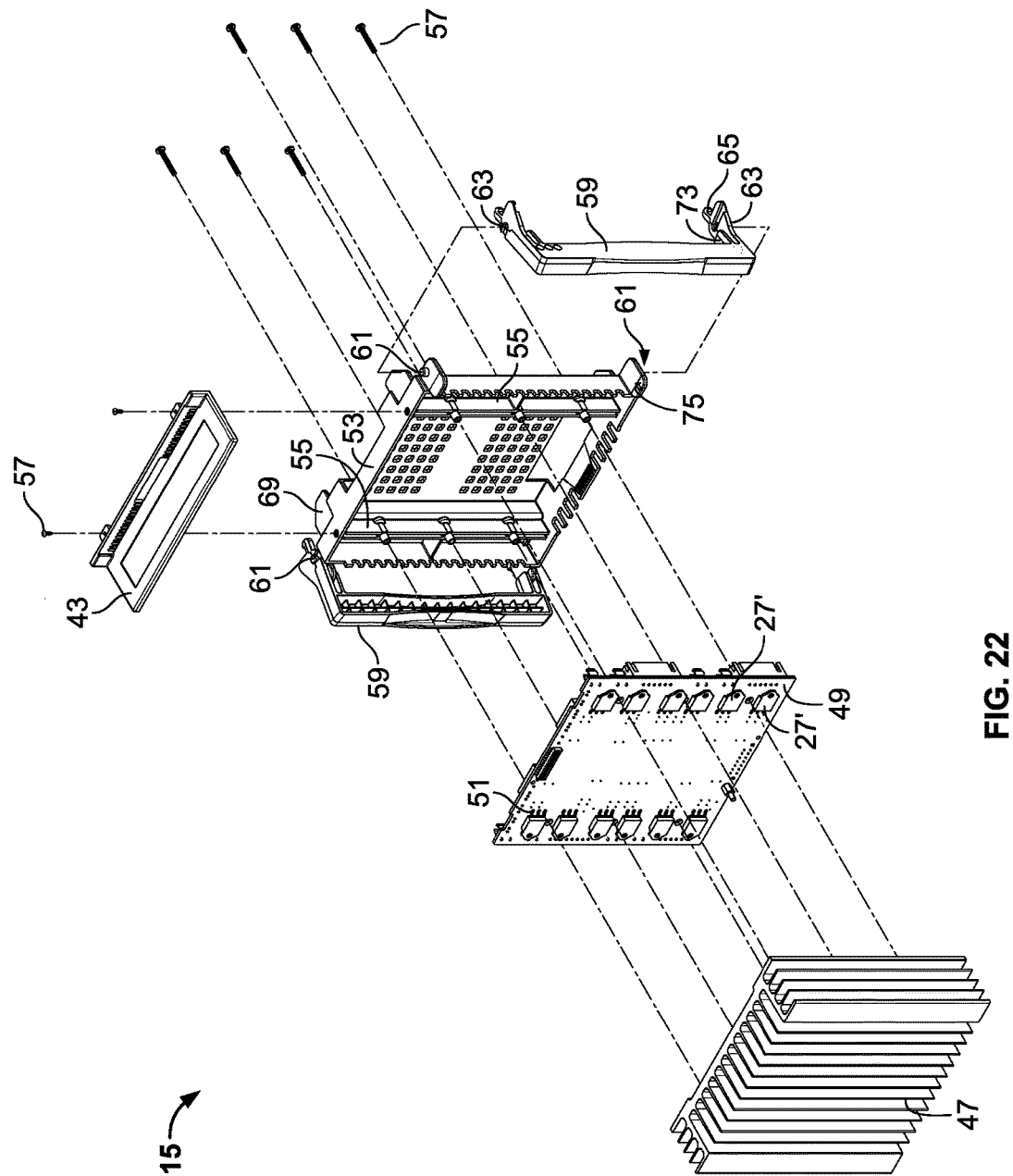
FIG. 22 is an exploded view of the dimmer module/assembly of FIG. 17.

As best shown in FIGS. 19, 20 and 22, baffle member 43 typically extends along at least a portion of the top surface of heat sink 47 of control assembly 15. In exemplary embodiments, baffle member 43 extends substantially along the length and width of the top surface of heat sink 47 of control assembly 15 for thermal management purposes. In exemplary embodiments, baffle member 43 is mounted with respect to rear enclosure or housing 53 of the assembly 15 (e.g., to the top surface of rear housing 53 via fastening members 57 or screws, etc.—FIG. 22).

In general, the convection cooling performance of the enclosure 41 is improved (FIG. 15) by adding baffle member 43 to at least one control assembly 15 (e.g., to the top surface of heat sink 47). It has been found that baffle member 43 advantageously creates turbulence in the rising hot air from/in the heat sink 47 and directs at least some of the rising hot air out through the front of the enclosure 41. More particularly and as depicted in FIG. 15, at least some of the heat generated by the lower assemblies 15 is diverted out the front of the enclosure 41 and away from the upper assemblies by baffle members 43. In exemplary embodiments and as shown in FIG. 15, each assembly 15 in enclosure 41 includes a baffle member 43 for improved thermal management purposes.

Figure 16:
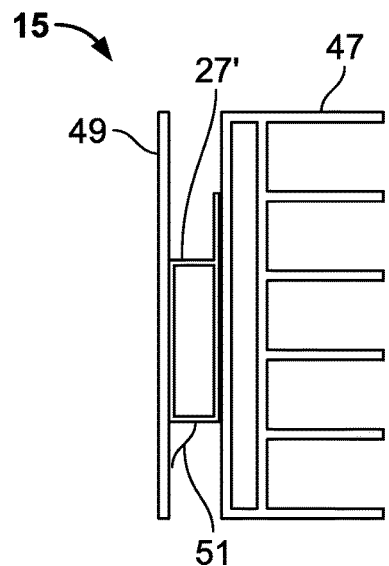
FIG. 16 is a side view of a heat sink, heat generating member and PCB according to an exemplary embodiment of the present disclosure.
Figure 17:
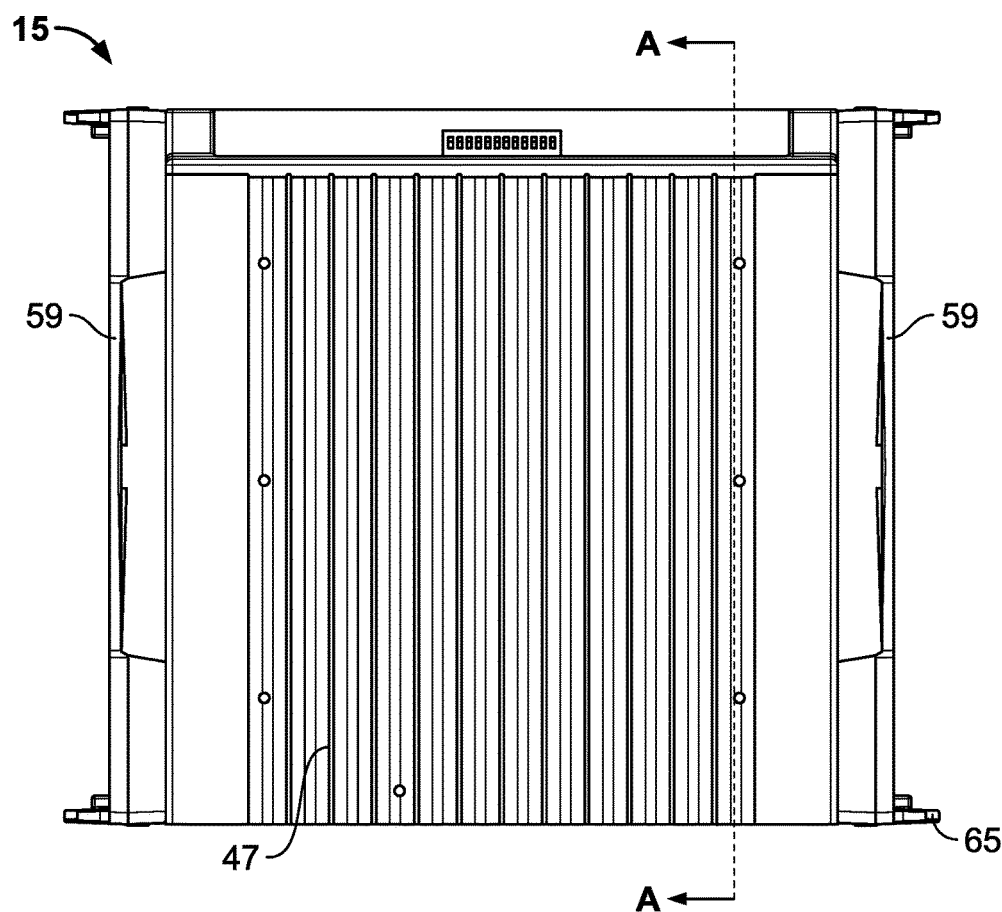
FIG. 17 is a front view of a dimmer module/assembly according to an exemplary embodiment of the present disclosure.

As shown in FIGS. 16 and 22, the present disclosure also provides for improved systems and methods for mounting a heat generating member 27' (e.g., a switching semiconductor 27') with respect to the heat sink 47 and PCB 49 of assembly 15. As noted above, previous mounting techniques required additional mounting space between the heat sink and the PCB that caused the heat sink to be smaller, and/or required heat to be transferred from the heat generating member and through the printed circuit board (PCB) before being transferred to the heat sink.

The present disclosure advantageously provides a system/method for mounting the heat generating member 27' (e.g., a switching semiconductor 27') substantially parallel or horizontally with respect to the surface of the PCB 49 facing the heat sink 47 (and facing the front of enclosure 41), with the rear side of the heat generating member 27' substantially facing the heat sink 47.

Figure 18:
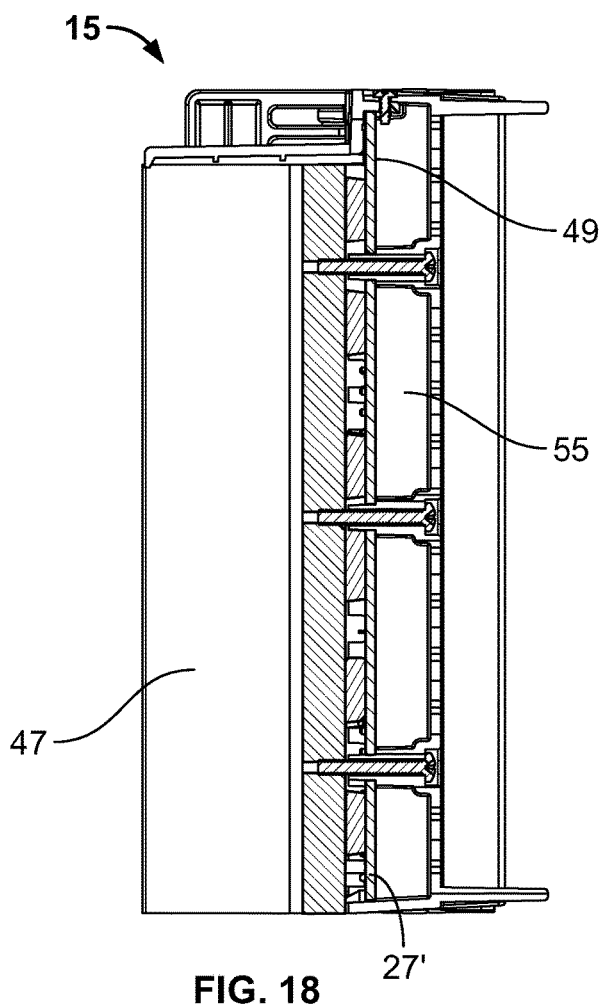
FIG. 18 is a side cross-sectional view taken substantially along the line A-A of the dimmer module/assembly of FIG. 17.

In one embodiment and as shown in FIGS. 16 and 22, the heat generating member 27' is a switching semiconductor or the like, and the leads 51 of the semiconductor 27' are configured and dimensioned so that they extend toward the front side of the semiconductor 27' and touch at least a portion of the PCB 49, where they then can be fastened or soldered to the PCB 49. As shown in FIGS. 16 and 22, this thereby advantageously positions and/or sandwiches the semiconductor 27' between the PCB 49 and the heat sink 47 (see also FIG. 18).

In general, the rear housing 53 of the assembly 15 includes at least one supporting member 55 (FIG. 22). In exemplary embodiments, housing 53 includes two supporting members 55, each supporting member 55 extending from the bottom side to the top side of housing 53. Supporting member 55 may be a presser board or presser bar or the like that is formed/fabricated into or mounted with respect to housing 53.

Fastening members 57 (e.g., screws or the like) are typically attached through the rear enclosure 53 (e.g., through each supporting member 55), and then through the printed circuit board 49, and then into the heat sink 47. When the members 57 are tightened, the rear housing 53 (e.g., each supporting member 55) presses on/against the printed circuit board 49 and holds the at least one semiconductor 27' tightly to or proximal the heat sink 47. This thereby provides for an excellent thermal transfer from the at least one semiconductor 27' to the heat sink 47. Also, the heat sink 47 can be made as large as possible, because the members 27' are not mounted perpendicular or vertically with respect to the surface of the PCB that faces the heat sink 47, which would restrict the size of the heat sink 47.

Figure 23:
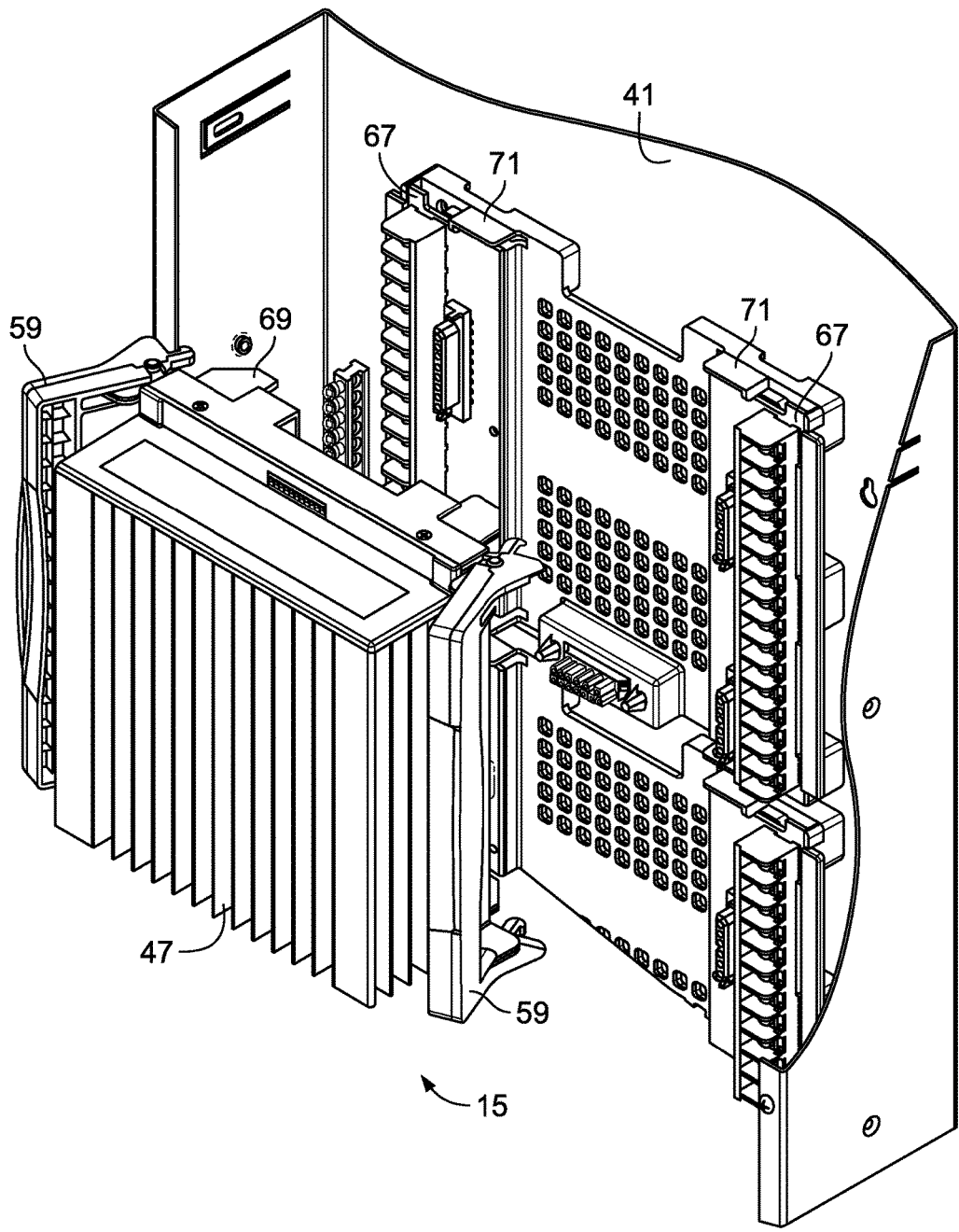
FIG. 23 is a partial front perspective view of the dimmer module/assembly of FIG. 17, prior to mounting with respect to an exemplary enclosure of the present disclosure.
Figure 24:
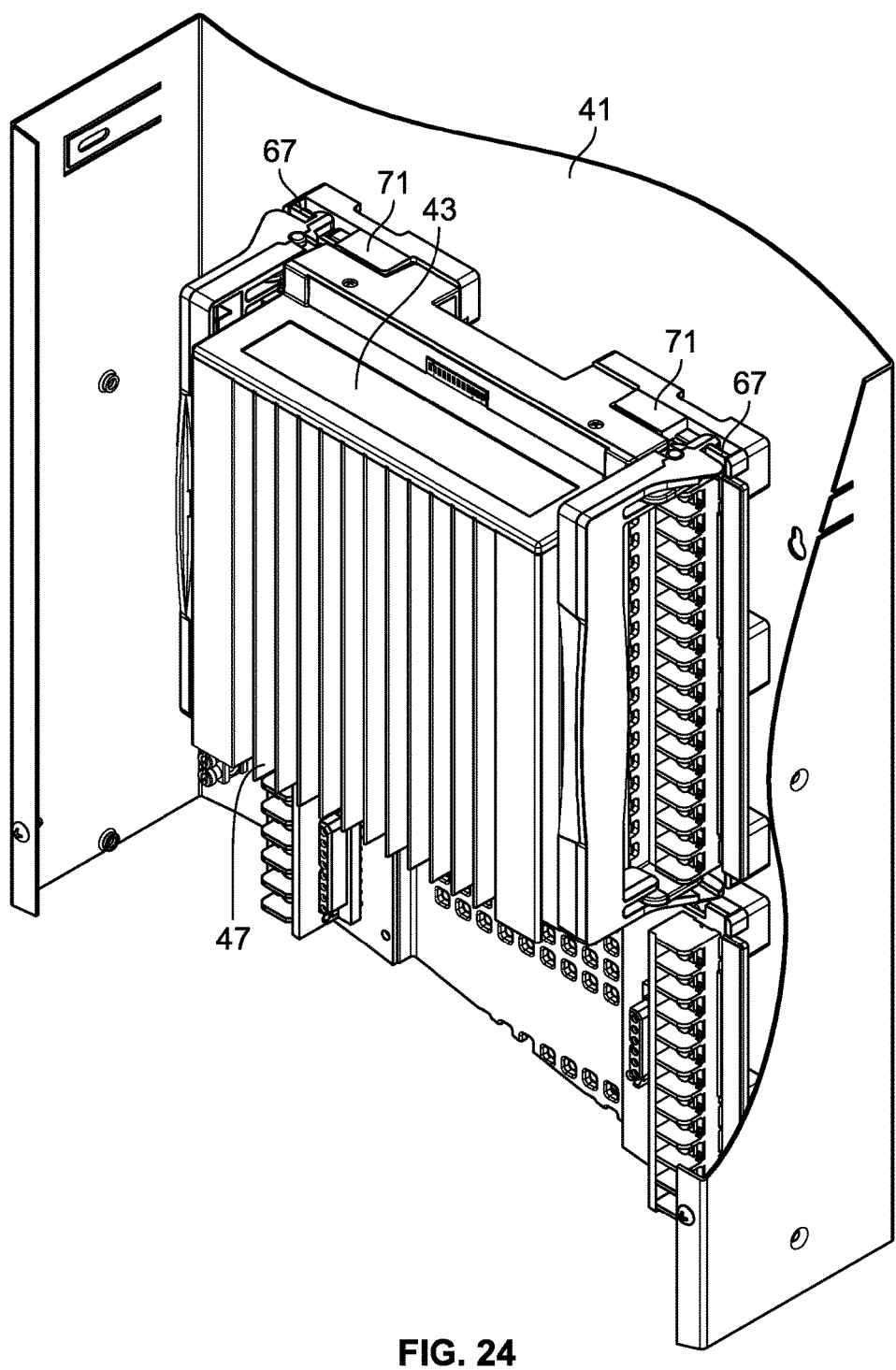
FIG. 24 is a partial front perspective view of the dimmer module/assembly and enclosure of FIG. 23, after mounting.

With reference to FIGS. 19-24, assembly 15 also typically includes at least one handle member 59. In exemplary embodiments, assembly 15 includes two handle members 59, each handle member 59 configured and dimensioned to be mounted with respect to a first or second side of the housing 53 via at least one securing member 61 of the first and second side of housing 53. In one embodiment, each side of housing 53 includes two securing members 61 that are configured and dimensioned to allow handle member 59 to be releasably and movably (e.g., rotationally) mounted with respect to each side of housing 53 (FIGS. 20, 22 and 23).

Each handle member 59 typically includes at least one receiving feature 63 (e.g., an aperture or recess) that is configured to mount with respect to a securing member 61 (e.g., a pin member or protrusion) of housing 53. In exemplary embodiments, each handle member 59 also includes at least one engaging member 73 (e.g., an engaging member 73 that includes a ridged/raised and/or recessed portion) that is configured and dimensioned to releasably fasten or secure to (e.g., in a snap-fit manner) at least one corresponding engaging member 75 (e.g., an engaging member 75 that includes a ridged/raised and/or recessed portion) of housing 53, to releasably secure the handle member 59 to the housing 53 (e.g., when assembly 15 is inserted into and/or mounted with respect to enclosure 41).

For example, each handle member 59 may include a top and bottom receiving feature 63 that mounts/mates with respect to a securing member 61, thereby releasably and movably mounting each handle member 59 to a side of housing 53. Mounted handle members 59 may then advantageously be rotated, pivoted, moved or swung about each side of housing 53 via securing members 61 (e.g., for mounting purposes to enclosure 41). In this regard, each handle member 59 typically includes at least one latching member 65 (e.g., two members 65 for each handle member 59), with each latching member 65 configured to latch or mount with respect to a corresponding mating member 67 of enclosure 41 to facilitate mounting assembly 15 to enclosure 41.

Moreover, rear housing 53 also typically includes at least one extending member 69 (e.g., four members 69) that extend from the rear of housing 53, each extending member 69 configured to mate or mount with respect to a corresponding receiving member 71 of enclosure 41 to facilitate mounting assembly 15 to enclosure 41.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A control assembly comprising:
   a first load circuit, the first load circuit including a first load control device, the first load control device in communication with a first controlled device;
   a processor in communication with the first load control device; and
   a first line feed associated with the first load circuit and in communication with the first load control device;
   wherein at least a portion of the first line feed is configured to travel to and be output by the first load control device as a first load output to the first controlled device;
   wherein the processor is in communication with the first load control device via a first control signal line;
   wherein the processor is adapted to store a plurality of individual data points, each individual data point being a value that represents the magnitude of a control signal on the first control signal line that is generated for a different dim level of the first controlled device;

wherein the individual data points are spaced apart from one another from a low dim level to a high dim level of the first controlled device;

wherein the processor is adapted to determine a magnitude of a first control signal for a first dim level of the first controlled device that is positioned between first and second data points of the plurality of data points, the first and second data points adjacent to one another from the low dim level to the high dim level;

wherein the processor is adapted to determine a magnitude of a second control signal for a second dim level of the first controlled device that is positioned between third and fourth data points of the plurality of data points, the third and fourth data points adjacent to one another from the low dim level to the high dim level;

wherein the first controlled device has a non-linear relationship between power delivered to the first controlled device and the light intensity of the first controlled device when power is delivered to the first controlled device at each individual data point from the low dim level to the high dim level; and wherein the first controlled device has a linear transition in light intensity between the first dim level and the second dim level.

2. The assembly of claim 1, wherein the processor stores about thirty-three individual data points, each individual data point being spaced apart from one another from the low dim level to the high dim level of the first controlled device; and wherein the first nine data points proximal to the low dim level are spaced apart from one another by about 2% of the total number of dim levels of the first controlled device, and the remaining data points are spaced apart by about 3.5% of the total number of dim levels of the first controlled device.

3. The assembly of claim 1, wherein the data points are generated manually by a user.

4. The assembly of claim 1, wherein the data points are generated by software associated with a light meter, the light meter configured and adapted to measure the light intensity of the first controlled device at a plurality of dim levels.

* * * * *